(12) United States Patent
Rosenberg et al.

(10) Patent No.: US 11,635,847 B2
(45) Date of Patent: *Apr. 25, 2023

(54) SYSTEM AND METHOD FOR DETECTING AND CHARACTERIZING TOUCH INPUTS AT A HUMAN-COMPUTER INTERFACE

(71) Applicant: Sensei, Inc., Sunnyvale, CA (US)

(72) Inventors: Ilya Daniel Rosenberg, Sunnyvale, CA (US); Aaron Zarraga, Sunnyvale, CA (US); Vijay Rajanna, Sunnyvale, CA (US); Tomer Moscovich, Sunnyvale, CA (US)

(73) Assignee: Sensei, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/574,504

(22) Filed: Jan. 12, 2022

(65) Prior Publication Data

US 2022/0137812 A1   May 5, 2022

Related U.S. Application Data

(63) Continuation of application No. 17/196,966, filed on Mar. 9, 2021, now Pat. No. 11,334,190.

(60) Provisional application No. 62/987,290, filed on Mar. 9, 2020.

(51) Int. Cl.
*G06F 3/041* (2006.01)
*G06F 3/045* (2006.01)
*G06F 3/044* (2006.01)

(52) U.S. Cl.
CPC ........ *G06F 3/041661* (2019.05); *G06F 3/045* (2013.01); *G06F 3/0418* (2013.01); *G06F 3/0443* (2019.05); *G06F 3/04144* (2019.05)

(58) Field of Classification Search
CPC .. G06F 3/041661; G06F 3/0443; G06F 3/045; G06F 3/0418; G06F 3/04144
See application file for complete search history.

(56) References Cited

U.S. PATENT DOCUMENTS 11,334,190 B2 * 5/2022 Rosenberg .............. G06F 3/045

* cited by examiner

*Primary Examiner* — Jonathan A Boyd
(74) *Attorney, Agent, or Firm* — Run8 Patent Group, LLC; Peter Miller; Alexander Rodriguez

(57) ABSTRACT

One variation of a method for detecting an input at a touch sensor—including a force-sensitive layer exhibiting variations in local resistance responsive to local variations in applied force on a touch sensor surface and a set of drive and sense electrodes—includes: driving a drive electrode with a drive signal; reading a sense signal from a sense electrode; detecting a alternating-current component and a direct-current component of the sense signal; in response to a magnitude of the direct-current component of the sense signal falling below a threshold magnitude, detecting an input on the touch sensor surface during the scan cycle based on the alternating-current component of the sense signal; and, in response to the magnitude of the direct-current component of the sense signal exceeding the threshold magnitude, detecting the input on the touch sensor surface during the scan cycle based on the direct-current component of the sense signal.

20 Claims, 10 Drawing Sheets

US 11,635,847 B2

SYSTEM AND METHOD FOR DETECTING AND CHARACTERIZING TOUCH INPUTS AT A HUMAN-COMPUTER INTERFACE

CROSS-REFERENCE TO RELATED APPLICATIONS

This Application is a continuation of U.S. patent application Ser. No. 17/196,966, filed on 9 Mar. 2021, which claims the benefit of U.S. Provisional Patent Application No. 62/987,290, filed on 9 Mar. 2020, which is incorporated in its entirety by this reference.

This Application is related to U.S. patent application Ser. No. 14/499,001, filed on 26 Sep. 2014, which is incorporated in its entirety by this reference.

TECHNICAL FIELD

This invention relates generally to the field of systems and more specifically to a new and useful human-computer interface system in the field of systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
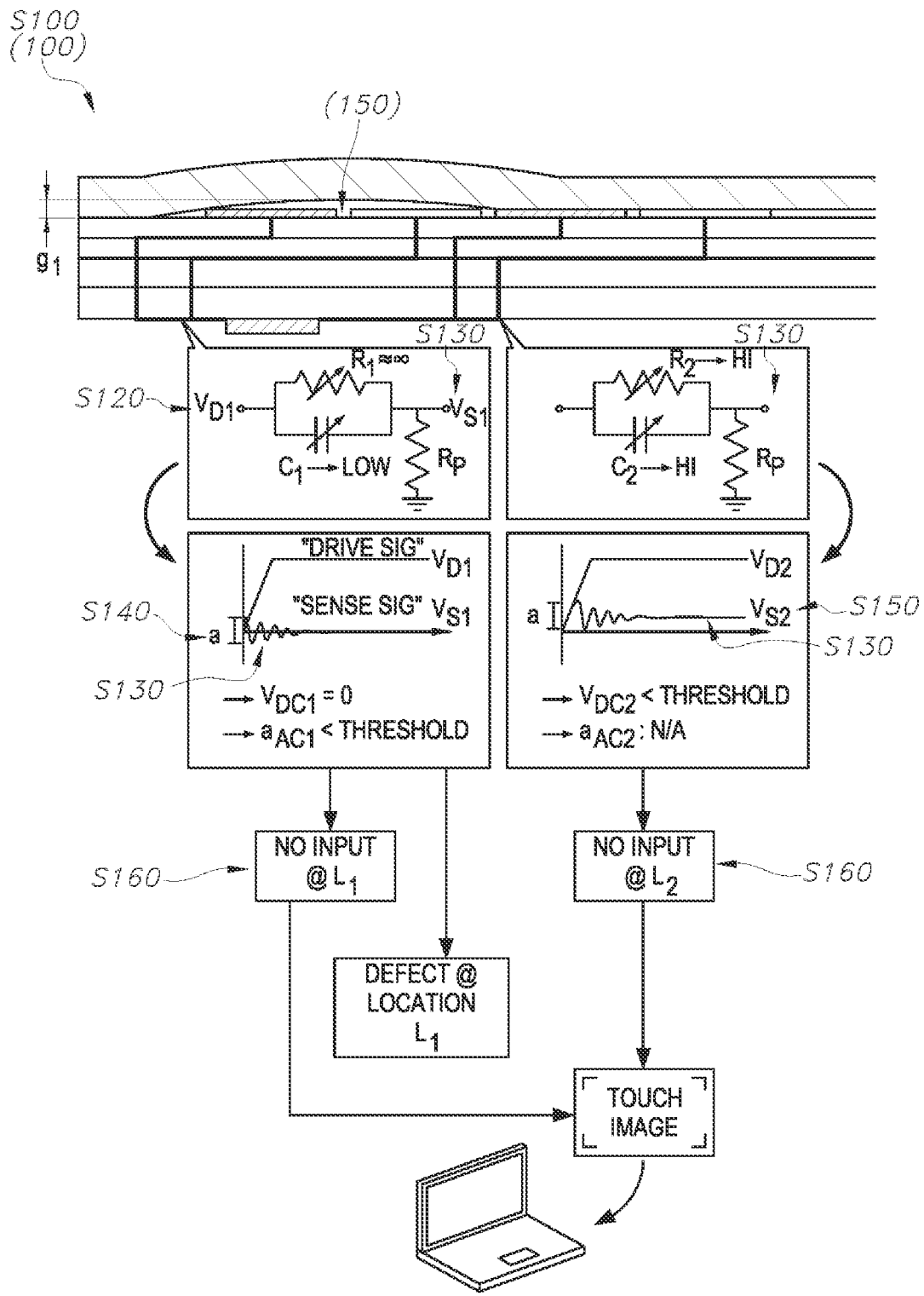
FIGS. 1A and 1B are flowchart representations of a method and a system.
Figure 1B:
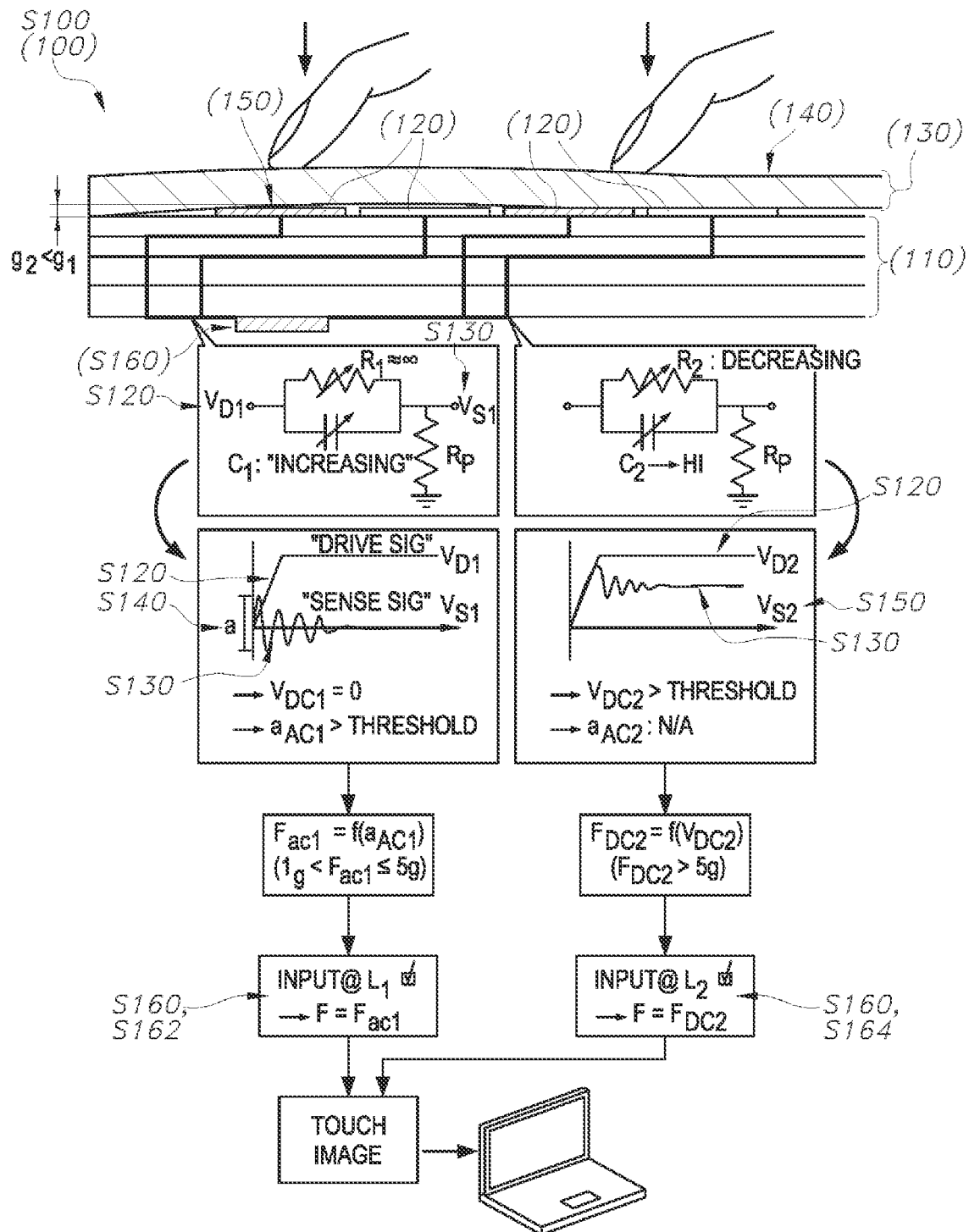
Figure 3:
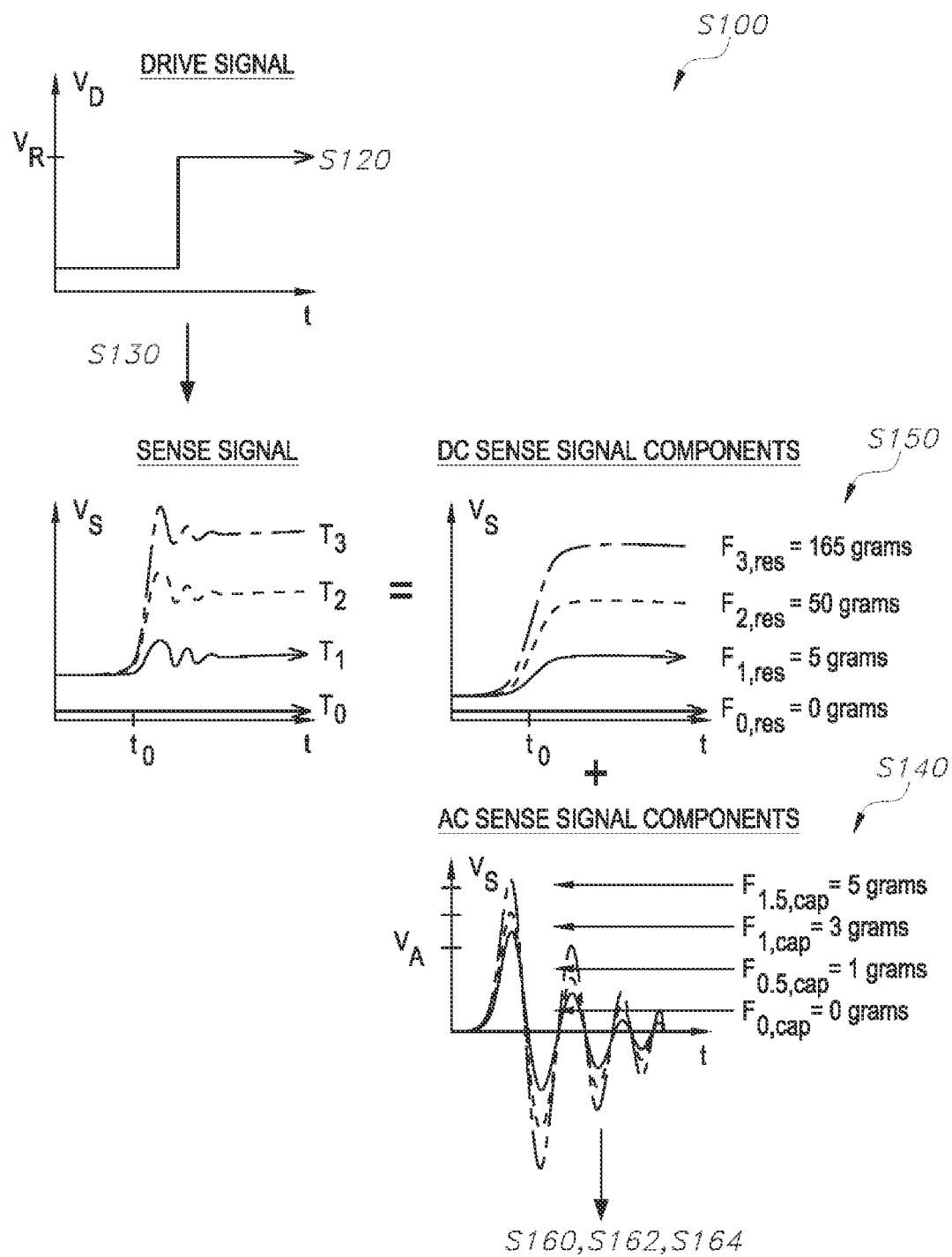
FIG. 3 is a flowchart representation of one variation of the method.

As shown in FIGS. 1A, 1B, and 3, a method S100 for detecting and characterizing touch inputs includes: detecting an input on a touch sensor surface 140 comprising a set of drive electrode and sense electrode pairs and a conductive force-sensitive layer 130 in Block S110, driving a drive electrode in a first drive electrode and sense electrode pair to a reference potential in Block S120; sampling an output signal at a sense electrode in the first drive electrode and sense electrode pair in Block S130; calculating a capacitance value between the drive electrode and the sense electrode based on an AC component of the output signal in Block S140; calculating a resistance value between the drive electrode and the sense electrode based on a DC component of the output signal in Block S150; and calculating a force magnitude and location of the input on the touch sensor surface 140 based on the resistance value and the capacitance value in Block S160.

1.1 Applications

Generally, method S100 can be executed by a system 100 that includes: a set of drive electrode and sense electrode pairs (hereinafter a "pressure sensor array") arranged across a substrate 110; a controller 160; and a force-sensitive layer 130 exhibiting changes in contact resistance across adjacent drive and sense electrode pairs (or changes in local bulk resistance) as a function of local applied force, arranged over the pressure sensor array, and forming an air gap 150 over the pressure sensor array; and a tactile surface over the force-sensitive layer 130. The controller 160 can execute Blocks of the method S100 to: interpret changes in capacitance between drive electrode and sense electrode pairs as local positions of light touches and/or initial contact of heavy touches on the tactile surface, which displace the force-sensitive layer 130 toward the pressure sensor array and thus locally compress the air gap 150); and to interpret changes in resistance between drive electrode and sense electrode pairs as local positions and force magnitudes of touches on the tactile surface.

More specifically, the force-sensitive layer 130 is arranged over the pressure sensor array to form a small (e.g., 5-micron-tall, 10-micron-tall) air gap 150 between the pressure array and a proximal surface of the force-sensitive layer 130. The force-sensitive layer 130 exhibits a permittivity (e.g., dielectric constant) that differs from the permittivity of air, such that displacement of the force-sensitive layer 130 toward the pressure sensor array results in a change in overall permittivity between the drive electrode and sense electrode pairs, thereby effecting internal capacitive coupling between these drive electrode and sense electrode pairs as a function of (e.g., proportional to) local changes in height of the air gap 150. In this configuration, even very light forces (e.g., forces under 5 grams) applied over the tactile surface may displace the force-sensitive layer 130 toward the pressure sensor array and significantly reduce the height of the air gap 150, thus changing (e.g., increasing) internal capacitance between a subset of drive electrode and sense electrode pairs adjacent this force. The system 100 can therefore sample (e.g., measure, calculate) the internal capacitive coupling between each drive electrode and sense electrode pair in the pressure sensor array during a scan cycle (and/or over a sequence of scan cycles) and detect, characterize, and track application of (very) light forces on the tactile surface based on derived changes in internal capacitive coupling between these drive electrode and sense electrode pairs.

Concurrently, the controller 160 can: detect changes in resistance between drive electrode and sense electrode pairs resulting from application of larger forces—on the tactile surface—that compress the force-sensitive layer 130 against the pressure sensor array and yield local changes in bulk resistance of the force-sensitive layer 130 or changes in contact resistance between the force-sensitive layer and adjacent drive and sense electrode pairs electrodes; and interpret these changes in resistance as location and magnitude of larger forces applied to the tactile layer. The controller 160 can then merge locations and force magnitudes of higher-force inputs (e.g., greater than 5 grams) derived from changes in resistance between drive electrode and sense electrode pairs with locations of lower-force inputs (e.g., less than 5 grams) derived from capacitive coupling between drive electrode and sense electrode pairs to generate more comprehensive representation of inputs across the tactile surface during a scan cycle (e.g., a force distribution, a contact map).

In particular, the system 100 can set a minimum threshold change in resistance for detecting inputs on the touch sensor surface 140 based on resistance changes between drive electrode and sense electrode pairs in order to reject noise and reduce false positive detection of inputs on the tactile surface. However, the system 100 can also substitute the resistance-based dynamic range of the pressure sensor array below this minimum threshold change in resistance with input detection based on changes in internal capacitive coupling between the drive electrode and sense electrode pairs. More specifically, the system 100 is configured to: drive a drive electrode in the pressure sensor array to a reference potential (e.g., with an input waveform); measure an output signal (e.g., voltage, current draw) at a corresponding sense electrode over a sampling period; and interpret (e.g., analyze, disambiguate) the output signal to concurrently derive (e.g., calculate) a capacitance value between the drive electrode and sense electrode pair based on characteristics of the output signal. For example, the controller 160 can derive the capacitance value proportional to an amplitude of oscillation in the sense electrode output signal (e.g., an AC component of the output signal). Concurrently and/or subsequently, the controller 160 can calculate the resistance value proportional to a steady-state value of the sense electrode output signal (e.g., a DC component of the output signal). For very light input forces (e.g., less than 5 grams), the capacitive component of the sense electrode output signal dominates, thus enabling the system 100 to accurately detect an object at the location on the tactile surface corresponding to the drive electrode and sense electrode pair even if the drive electrode and sense electrode pair exhibits little to no change in resistive coupling.

Additionally, because the internal capacitance between drive electrode and sense electrode pairs depends only on the geometry of the pressure sensor array and the size of the air gap 150, the system 100 can leverage sampled capacitance values in order to detect and characterize inputs unaffected by certain defects in the system 100, such as discontinuities and/or irregularities (e.g., dead zones) in the force-sensitive layer 130, print defects in the substrate 110, and/or residual dust on the force-sensitive layer 130 or electrode surfaces. Similarly, because the conductive force-sensitive layer 130 confines electric fields generated by drive electrodes below the tactile surface, the system 100 can detect contact between any type of object and the tactile surface (e.g., a gloved finger, a pen, a stylus), as well as detect and characterize inputs in the presence of water and/or other materials on the touch sensor surface 140.

1.2 System

As shown in FIGS. 1A and 1B, the system 100 includes: a touch sensor surface 140; a set of drive electrode and sense electrode pairs 120 arranged across a substrate 110 (e.g., a rigid PCB); a controller 160 coupled to the set of drive electrodes and sense electrodes; and a force-sensitive layer 130 arranged between the touch sensor surface 140 and the set of drive electrode and sense electrode pairs 120, including a conductive material that exhibits variations in local bulk resistance and/or local contact resistance responsive to forces applied over (e.g., exerted on) the touch sensor surface 140. In one implementation, the system 100 includes a grid array of interdigitated drive electrodes and sense electrodes (or "array of drive electrode and sense electrodes") patterned across (e.g., deposited on, integrated into) a rigid substrate, such as a fiberglass PCB or other PCB on a rigid backing. The force-sensitive layer 130 is arranged into a continuous layer (e.g., arranged on a back side of the touch sensor surface 140, installed at a small (e.g., 5-micron-tall, 10-micron-tall) separation over the array of drive electrode and sense electrode pairs 120, and connected to the substrate 110 about its perimeter, forming a thin air gap 150 between the force-sensitive layer 130 and the sensor elements.

In this configuration, application of a localized force to the touch sensor surface 140 (e.g., a touch input) displaces and/or compresses the force-sensitive layer 130, thereby changing the resistance across local drive electrode and sense electrode pairs 120 proportional to the magnitude of the applied force. Additionally, forces applied over the touch sensor surface 140 reduce the local separation between the (conductive) force-sensitive layer 130 and the array of drive electrode and sense electrodes, thereby changing internal capacitive couplings between adjacent drive electrode and sense electrode pairs 120. The controller 160 is therefore configured to: drive a set of the drive electrodes to a reference potential; sample corresponding output signals (e.g., voltages) at corresponding sense electrodes; and analyze (e.g., interpret, disambiguate) the output signals to derive (e.g., compute, calculate) a capacitance value and a resistance value across each drive electrode and sense electrode pair 120 within the system 100. The controller 160 can then transform the resulting sets of resistance values and capacitance values into positions and/or magnitudes of discrete force inputs applied over the touch sensor surface 140 (e.g., a force distribution) and a capacitance (e.g., touch) image representing the positions and sizes of objects contacting the touch sensor surface 140.

The system 100 can be integrated into a laptop computer, a portable electronic device (e.g., a tablet, a smartphone, a wearable device), a peripheral keyboard and/or trackpad, or any other electronic device in order to detect and characterize touch inputs by a user. For example, the substrate 110 can be bonded to the chassis of a laptop computer such that the touch sensor surface 140 defines an opaque touchpad and/or keyboard surface. In another example, the system 100 can be arranged under a display to form a pressure-sensitive touch screen for a tablet, smartphone, or smartwatch. However, these examples are merely illustrative. The system 100 can also be integrated into any suitable electronic device in order to detect and characterize inputs.

1.3 Internal Capacitance Between Drive Electrode and Sense Electrodes

Figure 2:
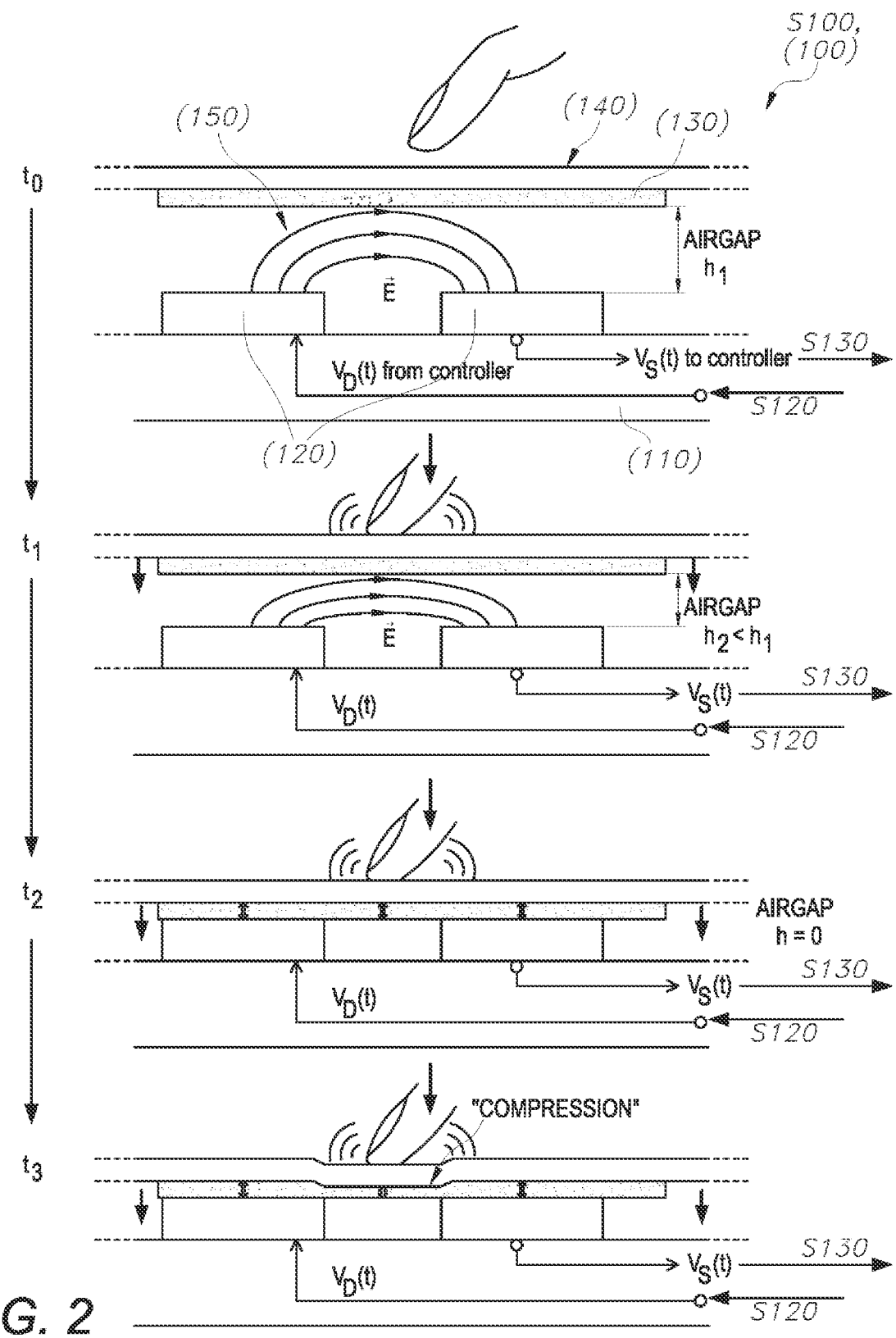
FIG. 2 is a flowchart representation of one variation of the method and the system.

As shown in FIG. 2, the force-sensitive layer 130 can be arranged above the array of drive electrode and sense electrodes and connected (e.g., bonded, affixed) to the substrate no along its edges, thereby enclosing a thin (e.g., 5- to 10-micron tall) air gap 150 between electrodes in the array of drive electrode and sense electrodes and the proximal surface of the force sensitive layer. When driven at a reference potential (e.g., during a scan cycle), drive electrodes in each drive electrode and sense electrode pair 120 generate an electric field that can propagate through the air gap 150 (e.g., a dielectric) to a corresponding sense electrode, resulting in an internal capacitive coupling between the drive electrode and sense electrode pairs 120. However, the (conductive) force-sensitive layer 130 prevents propagation of electric field lines through the force-sensitive layer 130 and confines the electric fields generated by drive electrodes to the air gap 150 between the array of drive electrode and sense electrodes and the force-sensitive layer 130. Thus, displacement of the force-sensitive layer 130 toward the array of drive electrode and sense electrodes (e.g., resulting from a force applied over the touch sensor surface 140) increases the electric flux permitted through the air gap 150 (e.g., at a constant reference potential) and/or the vertical dimensions of the intermediate dielectric (e.g., air), thereby increasing the internal capacitance between drive electrode and sense electrode pairs 120 adjacent an object or input on the touch sensor surface 140.

Generally, the small separation (e.g., less than 10 microns) between the array of drive electrode and sense electrodes and the force-sensitive layer 130 prevents electric fields emitted by a drive electrode in a first drive electrode and sense electrode pair 120 from propagating to sense electrodes in other, nearby drive electrode and sense electrode pairs 120. Additionally, even under light forces (e.g., less than 5 grams, 0.05 Newtons) applied over the touch sensor surface 140, the force-sensitive layer 130 can experience displacements that are significant proportional to the z-height of the air gap 150. Thus, drive electrode and sense electrode pairs 120 proximal an input area may experience relatively large changes in internal capacitive coupling with no changes in resistive coupling (e.g., in response to very light applications of force). Thus, the controller 160 can sequentially drive each drive electrode in the array of drive electrode and sense electrodes to a reference potential and extract capacitance values across each drive electrode and sense electrode pair 120 from output signals received at corresponding sense electrodes in order to detect and track inputs (e.g., over a sequence of scan cycles) on the touch sensor surface 140 defining a large range of applied force.

1.4 Signal Processing and Input Characterization

Figure 4:
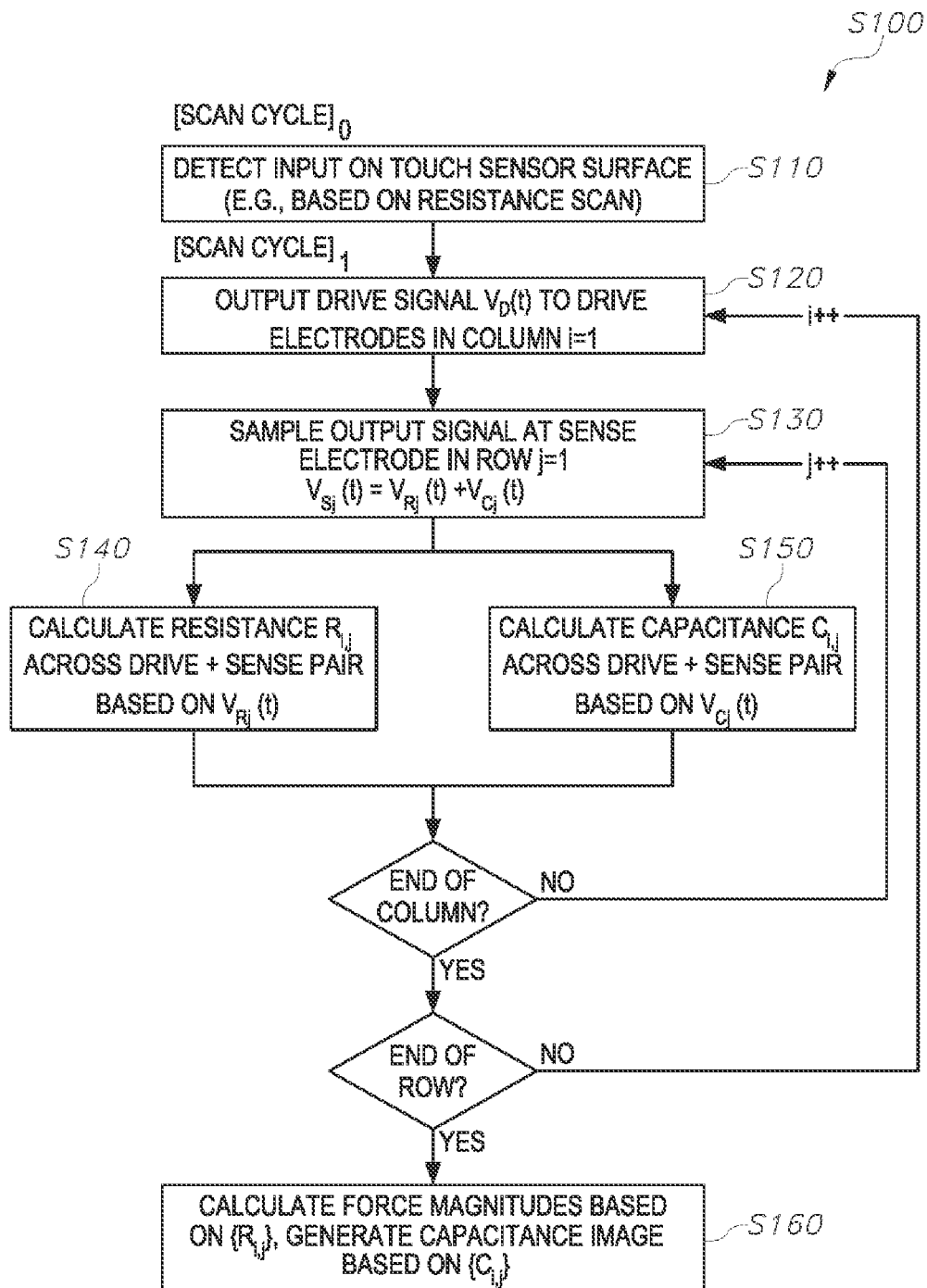
FIG. 4 is a flowchart representation of one variation of the method.

As shown in FIG. 4, Blocks of the method S100 recite: detecting an input on a touch sensor surface 140 comprising a set of drive electrode and sense electrode pairs 120 and a conductive force-sensitive layer 130 in Block S110. Generally, the controller 160 is configured to: sample a set of resistance values across drive electrode and sense electrode pairs 120 in the system 100; compare the set of resistance values and/or a force magnitude calculated based on the set of resistance values to a threshold value; and detect application of an input (e.g., presence of an object) and/or force in response to a resistance value or the force magnitude exceeding the threshold value. For example, during an initial scan cycle, the controller 160 can: sequentially drive each column of drive electrodes in the array of drive electrode and sense electrodes to a reference potential (e.g., while floating all other rows of drive electrodes); sequentially sample steady-state (e.g., DC) voltages and/or current draws at corresponding columns of sense electrodes; and transform the voltages sampled at the columns of sense electrodes into a set of resistance values and/or the magnitude and location of a force applied over the touch sensor surface 140. The controller 160 can then compare the set of resistance values and/or the force magnitude to a predetermined threshold value in order to detect application of an input to the touch sensor surface 140. Therefore, in one implementation, the controller 160 can detect initial application of an input or contact on the touch sensor surface 140 based on resistance values sampled during an initial resistance scan cycle.

Blocks of the method S100 further recite: driving a drive electrode in a first drive electrode and sense electrode pair 120 to a reference potential in Block S120; and sampling an output signal at a sense electrode in the first drive electrode and sense electrode pair 120 in Block S130. Generally, the controller 160 is configured to, during subsequent scan cycles: drive a drive electrode with an input voltage (e.g., an input waveform); and sample a sequence of output values and/or an output waveform at a corresponding sense electrode over a sampling period. In particular, the controller 160 can output a fixed reference potential (e.g., a square wave input) or a time-varying potential (e.g., a sine wave input) to the drive electrode. In one implementation, the controller 160 can select (e.g., previously select, concurrently select) a sampling window for a set of ADCs within the controller 160 based on characteristics (e.g., amplitude, frequency) of the input waveform and the geometry of the drive electrode and sense electrode pair 120. The controller 160 can then sample the voltage at the sense electrode over a sequence of sampling periods (e.g., 10 samples, 50 samples, 100 samples) and construct an output signal including time series of sense electrode voltages and/or current draws corresponding to the drive potential. In another implementation, the controller 160 can continuously sample the voltage and/or current draw from the sense electrode over a sampling period and construct an output signal defining a continuous waveform (e.g., a voltage curve, a current curve).

Blocks of the method S100 further recite: calculating a capacitance value between the drive electrode and the sense electrode based on an AC component of the output signal in Block S140; and calculating a resistance value between the drive electrode and the sense electrode based on a DC component of the output signal in Block S150. Generally, the controller 160 is configured to: analyze (e.g., interpret, decompose disambiguate) a sense electrode output (e.g., a potential curve); measure (e.g., derive, determine, calculate) a capacitive coupling between a drive electrode and sense electrode pair 120 based on a first component of the output signal; and simultaneously and/or subsequently measure (e.g., derive, determine, calculate) a resistive coupling between the drive electrode and the sense electrode pair 120 based on a second component of the output signal. More specifically, the controller 160 can interpret the sense electrode output (e.g., a time series of sense electrode voltages, a voltage curve) as a superposition of a capacitive signal component and a resistive signal component. The controller 160 can then derive a capacitance value between the drive electrode and sense electrode pair 120 based on characteristics of the capacitive signal component and subsequently or concurrently derive a resistance value across the drive electrode and sense electrode pair 120 based on characteristics of the resistive signal component.

In one implementation, the controller 160 can drive the drive electrode to a fixed reference potential (e.g., a square wave input) to generate a sense electrode output such as the output signal shown in FIG. 3. Generally, the sense electrode output (e.g., voltage curve) is a superposition of a damped AC signal (e.g., oscillating around a ground potential) of an amplitude and/or frequency proportional to the capacitance between the drive electrode and the sense electrode pair and a logistic potential curve (e.g., a DC resistive signal) with a steady-state value proportional to the resistance between the drive electrode and the sense electrode pair. The controller 160 can therefore be configured to: measure the amplitude of the AC signal component (e.g., by calculating a difference between a global maximum on the voltage curve and the steady-state/DC potential); measure the frequency of the AC signal component (e.g., by measuring a duration between local maxima of the AC signal component); and transform the measured amplitude and/or frequency of the AC signal component into a capacitance value between the drive electrode and the sense electrode based on derived correlations and/or calibration data. Similarly, the controller 160 can be configured to sample a steady-state value of the output signal (e.g., a DC signal component, steady-state voltage) and to transform the steady state voltage into a resistance value between the drive electrode and sense electrode pair 120.

In another implementation, the controller 160 can drive the drive electrode with an oscillating reference potential (e.g., a sine wave input) to generate a sense signal. In particular, the sense signal generated by a sinusoidal drive signal is a superposition of an undamped AC oscillation (e.g., a resistive signal component) with an amplitude proportional to the resistance between the drive electrode and the sense electrode, and a second, damped AC oscillation (e.g., a capacitive signal component) with an amplitude and/or frequency proportional to the capacitance between the drive electrode and the sense electrode that is phase-shifted relative to the resistive signal component. Generally, the controller 160 can be configured to differentiate (e.g., disambiguate, parse) the resistive AC signal component from the capacitive AC signal component based on a phase difference between the two AC signal components relative to the phase of the drive signal and/or an amplitude increase between capacitive and resistive regions of the sense signal. In one variation, the controller 160 can: drive the drive electrode with an oscillating drive signal and record a first sense signal; subsequently drive the drive electrode to a fixed (e.g., static) reference potential and record a second sense signal; calculate a resistance value between the drive electrode and the sense electrode based on the second sense signal; generate a capacitive output signal by subtracting the second sense signal from the first sense signal; and calculate a capacitance value between the drive electrode and the sense electrode based on an amplitude, frequency, and/or phase of the capacitive output signal relative to the oscillating drive signal.

However, these examples are merely illustrative. The controller 160 can also be configured to drive a drive electrode with any suitable time-dependent input signal and execute corresponding processes to derive (e.g., measure, calculate, compute) both an internal capacitance and a resistance between a drive electrode and sense electrode pair 120 from the same sense signal, thereby enabling the controller 160 to simultaneously sample resistance and capacitance data across drive electrode and sense electrode pairs 120 during a single scan cycle.

Blocks of the method S100 further recite: calculating a force magnitude and a location of the input on the touch sensor touch sensor surface 140 based on the resistance value and the capacitance value in Block S160. Generally, the controller 160 is configured to: transform a calculated resistance value between a drive electrode and sense electrode pair 120 into a magnitude and/or location of a force applied over the touch sensor surface 140 at the location of the drive electrode and sense electrode pair 120; and interpret the calculated capacitance value between the drive electrode and sense electrode pair 120 as a presence of an object (e.g., an input) contacting the touch sensor surface 140 at the location of the drive electrode and sense electrode pair 120. Thus, as shown in FIG. 4, the controller 160 can sample a set of resistance values and a set capacitance values by sequentially executing Blocks S120, S130, S140, and S150 of the method S100 for each drive electrode and sense electrode pair 120 in the array of drive electrode and sense electrodes during a scan cycle. The controller 160 can then transform the set of resistance into a pressure image (e.g., a resistance image, a force image) representing a force distribution across the area of the touch sensor surface 140 (e.g., corresponding to application of an input) during the scan cycle. Additionally and/or alternatively, the controller 160 can transform the set of capacitance values into a capacitance image representing the locations and sizes of objects contacting the touch sensor surface 140 during the scan cycle. The controller 160 can then derive (e.g., determine, compute) a location of an input on the touch sensor surface 140 and/or locations of multiple simultaneous inputs (e.g., a multi-finger gesture) on the touch sensor surface 140 based on the capacitance image. For example, the controller 160 can calculate an (x,y) location of a centroid of a high capacitance (or low capacitance) region of the capacitance image and associate the centroid's location with the location of an input on the touch sensor surface 140. The controller 160 can therefore calculate (e.g., determine) locations of inputs on the touch sensor surface 140 based only on measured changes in internal capacitances between drive electrode and sense electrode pairs 120 in the array of drive electrode and sense electrodes (e.g., independent of resistance data), thereby enabling the system 100 to accurately detect and track low-force magnitude (e.g., less than 5 grams, 0.05 Newtons) inputs one the touch sensor surface 140.

In one implementation, the controller 160 is further configured to combine (e.g., integrate, overlay) the pressure image with the capacitance image and output a touch image (e.g., an annotated touch image) that includes the total force applied over the touch sensor surface 140 and/or a force distribution across the touch sensor surface 140, as well as locations, sizes and/or types of objects contacting the touch sensor surface 140 during each scan cycle. Generally, the controller 160 is configured to sequentially execute scan cycles (e.g., Blocks S120, S130, S140, S150, and S160 of method) at a predetermined or configurable scan frequency (e.g., 10 Hz, 50 Hz, 100 Hz) in order to continuously detect, characterize, and/or track movement of objects and forces on the touch sensor surface 140. Thus, when the system 100 is integrated into an electronic device (e.g., a laptop computer, a smartphone), the device can then execute command functions based on touch images output by the controller 160, such as updating the position of a cursor.

1.5 Baselining and Redundancy

The controller 160 is further configured to modify a capacitance image generated during a scan cycle based on pressure images (e.g., resistance images, force images) generated during the scan cycle or during previous scan cycles. Generally, the capacitance image may exhibit secondary effects produced by air movement within the gap between the force-sensitive layer 130 and the pressure during or succeeding the application of a force to the touch sensor surface 140, which can reduce accuracy of location calculations based on the capacitance image. For example, the capacitance image may include a trail corresponding to movement of an input across the touch sensor surface 140, which artificially displaces (e.g., shifts, pulls back) the centroid of the input area. Therefore, in one implementation, the controller 160 can determine an input area and/or input size on the touch sensor surface 140 (e.g., areas of statistically significant, non-zero force application) based on a pressure image generated in a previous scan cycle and subtract out, ignore, or otherwise exclude capacitance values measured at drive electrode and sense electrode pairs 120 outside the input area in order to reduce or eliminate artifacts in the capacitance image. For example, the controller 160 can register (e.g., determine, compute) a circular region of the capacitance image centered around a local maximum in a corresponding force distribution (e.g., based on a pressure image from a previous scan cycle) and subtract out (e.g., baseline) capacitance values measured from drive electrode and sense electrode pairs 120 outside the circular region (e.g., input area) during the current scan cycle and subsequent scan cycles. Thus, the controller 160 can exclude capacitance values measured from distal drive electrode and sense electrode pairs 120 outside the input area in order to eliminate ripples, trails and other secondary effects within the air gap 150 from the capacitance image, thereby increasing the accuracy of location calculations based on the capacitance image.

The controller 160 is further configured to continuously update the position of the input area based on capacitance images generated during subsequent scan cycles. For example, the controller 160 can track a feature of the capacitance image associated with an input or an object on the touch sensor surface 140 throughout a sequence of scan cycles. Thus, the controller 160 can detect and track (e.g., measure, record) movement of an input across the touch sensor surface 140 based on capacitance images or differences in capacitance images generated over a sequence of scan cycles (e.g., independent of corresponding resistance data), enabling the system 100 to detect and track the location of very light (e.g., less than 5 grams, 0.05 Newtons) applied forces. Additionally, the controller 160 can compare resistance values and capacitance values from each drive electrode and sense electrode pair 120 in the array of drive electrode and sense electrodes and/or compare a pressure image with a corresponding capacitance image in order to identify and track inputs through any defective regions in the system 100 (e.g., due to small discontinuities/dead zones in the force-sensitive layer 130, print defects in the substrate 110 and/or dust or other micro-particles on the force-sensitive layer 130 or electrode surfaces).

2. Variation

As shown in FIGS. 1A, 1B, 6A, and 6B, one variation of the method S100—for detecting an input at a system 100 comprising a force-sensitive layer 130 exhibiting variations contact resistance across adjacent drive and sense electrode pairs (or variations in local bulk resistance) responsive to local variations in applied force on a touch sensor surface 140, a set of drive electrodes, and a set of sense electrodes—includes: driving a first drive electrode, in the set of drive electrodes, with a drive signal during a first scan cycle in Block S120; reading a first sense signal from a first sense electrode, in the set of sense electrodes and paired with the first drive electrode, during the first scan cycle in Block S130; detecting a first alternating-current component of the first sense signal in Block S140; detecting a first direct-current component of the first sense signal in Block S150; in response to a magnitude of the first direct-current component of the first sense signal falling below a threshold magnitude, detecting a first input on the touch sensor surface 140 during the first scan cycle based on the first alternating-current component of the first sense signal in Block S162; and, in response to the magnitude of the first direct-current component of the first sense signal exceeding the threshold magnitude, detecting the first input on the touch sensor surface 140 during the first scan cycle based on the first direct-current component of the first sense signal in Block S164.

One variation of the method S100 5A and 5B, includes, during a first scan cycle: reading a first set of sense signals from a set of drive electrode and sense electrode pairs 120 in Block S130, each sense signal in the first set of sense signals representing a resistance between a drive electrode and sense electrode pair 120, in the set of drive electrode and sense electrode pairs 120, during the first scan cycle; and detecting a first input at a first location on a touch sensor surface 140 during the first scan cycle in Block S164 based on a first direct-current component of a first sense signal, in the first set of sense signals, indicating a first change in resistance between a first drive electrode and sense electrode pair 120, in the set of drive electrode and sense electrode pairs 120, located proximal the first location. This variation of the method S100 also includes, during a second scan cycle succeeding the first scan cycle: reading a second set of sense signals from the set of drive electrode and sense electrode pairs 120 in Block S130; and tracking the first input from the first location to a second location on the touch sensor surface 140 during the second scan cycle based on a second direct-current component of a second sense signal, in the second set of sense signals, indicating a second change in resistance between a second drive electrode and sense electrode pair 120, in the set of drive electrode and sense electrode pairs 120, located proximal the second location in Block S164. This variation of the method S100 further includes, during a third scan cycle succeeding the second scan cycle: reading a third set of sense signals from the set of drive electrode and sense electrode pairs 120 in Block S130; detecting a third direct-current component of a third sense signal read from a third drive electrode and sense electrode pair 120, in the set of drive electrode and sense electrode pairs 120, located proximal a third location on the touch sensor surface 140 in Block S150; detecting a third alternating-current component of the third sense signal in Block S140; and, in response to a third magnitude of the third direct-current component falling below a threshold magnitude, tracking the first input from the second location to the third location on the touch sensor surface 140 during the third scan cycle based on a third amplitude of the third alternating-current component of the third sense signal indicating a third change in capacitance between the third drive electrode and sense electrode pair 120 in Block S162.

2.1 Applications

Generally, in this variation, the system 100 can include: a substrate no; an array of drive electrode and sense electrode pairs 120 arranged across the substrate 110 (hereinafter the "sensor array"); a force-sensitive layer 130 arranged over the array of drive electrode and sense electrode pairs 120 and containing a material (e.g., conductive particulate in a polymer binder) exhibiting local changes in contact resistance across adjacent drive and sense electrode pairs (or local changes in local bulk resistance or impedance) as a function of applied force; and a touch sensor surface 140 over the force-sensitive layer 130.

2.2 Drive Electrode and Sense Electrode Pair as Variable Resistor

The system 100 further includes a controller 160 that executes Blocks of the method S100 to: drive drive electrodes in the sensor array with a drive signal (e.g., to a reference voltage potential); read sense signals (e.g., voltage timeseries) from sense electrodes in the sensor array; extract direct-current (or "DC") components from these sense signals (e.g., steady-state voltages); and interpret force magnitudes of inputs across the touch sensor surface 140 based on these DC sense signal components during a scan cycle, as shown in FIGS. 1B, 5A, 5B, 6A, and 6B, More specifically, the force-sensitive layer 130 bridges a gap between a drive electrode and sense electrode pair 120 and exhibits changes in contact resistance with the adjacent drive electrode and sense electrode pair 120 (or changes in local bulk resistance) as a function of force applied to the touch sensor surface 140 over this drive electrode and sense electrode pair 120. Thus, as this applied force increases, the contact resistance (or the local bulk resistance) of the force-sensitive layer 130 between this drive electrode and sense electrode pair 120 decreases, thereby yielding a greater voltage at the sense electrode when the controller 160 drives the adjacent drive electrode to a reference voltage potential. Therefore, the voltage at the sense electrode read by the controller 160 during a scan cycle represents a local contact resistance (or bulk resistance) of the force-sensitive layer 130 adjacent the drive electrode and sense electrode pair 120, which represents a magnitude of a force applied to the touch sensor surface 140 over the drive electrode and sense electrode pair 120. Accordingly, the controller 160 can: interpret a magnitude of force applied to the touch sensor surface 140 over the drive electrode and sense electrode pair 120 during a scan cycle based on the sense signal (e.g., a voltage) read from the sense electrode and known electrical characteristics of the force-sensitive layer 130; and detect an input on the touch sensor surface 140 over the drive electrode and sense electrode pair 120 based on this force, such as in response to this force exceeding a minimum contact force threshold (e.g., five grams, 0.5 Newtons) that drives the force-sensitive layer 130 into contact with the drive electrode and sense electrode pair 120. More specifically, a drive electrode and sense electrode pair 120 and an adjacent region of the force-sensitive layer 130 can form a variable-resistor that exhibits a characteristic resistance as a function of applied force (when the force-sensitive layer 130 is in contact with both the drive electrodes and sense electrodes) as shown in FIGS. 1A and 1B, and the controller 160 can read a sense signal (e.g., a voltage, a resistance) from the variable-resistor and interpret presence and force magnitude of an input on the touch sensor surface 140 over the drive electrode and sense electrode pair 120 based on this sense signal.

Furthermore, the controller 160 can concurrently execute this process for all drive electrode and sense electrode pairs 120 in the sensor array during one scan cycle to: interpret magnitudes of forces applied across the touch sensor surface 140 based on sense signals read from each sense electrode and known electrical characteristics of the force-sensitive layer 130; detect inputs across the touch sensor surface 140 based on these forces; and/or generate a touch image that represents a detected force at each drive electrode and sense electrode pair 120 location and/or that specified lateral and longitudinal positions of inputs on the touch sensor surface 140 and their detected force magnitudes.

2.3 Unintended Air Gap

In one application, assembly of the force-sensitive layer 130 over the substrate 110 produces regions of incomplete lamination between the force-sensitive layer 130 and the substrate 110, thereby resulting in volumes of air trapped between the force-sensitive layer 130 and the substrate 110 over a subset of drive electrode and sense electrode pairs 120 in the sensor array, FIG. 1A. Similarly, particulate trapped between the force-sensitive layer 130 and the substrate 110 during assembly and/or a lifting edge of an electrode on the substrate 110 may prevent complete lamination between the substrate 110 and the force-sensitive layer 130 and thus produce similar volumes of air therebetween.

Each trapped volume of air may separate the force-sensitive layer 130 from an adjacent drive electrode and sense electrode pair 120 such that the conductance between these drive electrode and sense electrode pairs 120 is or approaches a null value (i.e., such that the resistance across these drive electrode and sense electrode pairs 120 approaches an infinite value). Furthermore, application of a force on the touch sensor surface 140 over a trapped air volume may displace this air laterally, but the force-sensitive layer 130 may remain out of contact with the drive electrode and sense electrode pair 120 until a larger force in excess of the contact force threshold (e.g., greater than five grams, 0.5 Newtons) is applied to the touch sensor surface 140 over the trapped air volume to drive the force-sensitive layer 130 into full contact with the drive electrode and sense electrode pair 120. Because the force-sensitive layer 130 remains out of contact with the drive electrode and sense electrode pair 120 for inputs less than the contact force threshold, the resistance across the drive electrode and sense electrode pair 120 (and therefore the DC sense signal component read for the sense electrode) may remain effectively unchanged over a range of light to very-light inputs on the touch sensor surface 140 (e.g., between 1 and 5 grams, 0.01 to 0.05 Newtons), thereby preventing the controller 160 from detecting both presence and force magnitude of such light to very-light inputs based solely on the resistance across the drive electrode and sense electrode pair 120 (i.e., based solely on the DC components of sense signals read from the drive electrode and sense electrode pair 120).

Furthermore, the controller 160 may otherwise interpret application of a force equal to the contact force threshold over the drive electrode and sense electrode pair 120 as a baseline (or nominal, null) force magnitude. Accordingly, the controller 160 may fail to detect an input of force magnitude less than the contact force threshold over the trapped air volume given only the DC component of the sense signal read from the drive electrode and sense electrode pair 120. Upon detecting an input over the trapped air volume, the controller 160 may also calculate a force magnitude of this input that is offset from—and less than— the true force magnitude of the input by the contact force threshold given only the DC component of the sense signal read from the drive electrode and sense electrode pair 120.

2.3.1 Drive and Sense Electrode Pair as Variable Capacitor

However, a drive electrode and sense electrode pair 120 separated from the force-sensitive layer 130 may form a parallel-plate air-gap capacitor in parallel with the variable resistor formed by the drive electrode and sense electrode pair 120 and the force-sensitive layer 130, as described above. More specifically and as shown in FIGS. 1A and 1B, the drive electrode and sense electrode pair 120, the force-sensitive layer 130, and the trapped air volume can cooperate to form: a variable capacitor that exhibits a characteristic capacitance that changes as a function of distance that the force-sensitive layer 130 is depressed over the trapped air volume (and therefore a force applied to the touch sensor surface 140 over the trapped air volume); and a variable resistor connected to the variable capacitance in parallel and that exhibits a characteristic resistance that changes as a function of local force applied to the touch sensor surface 140.

The variable capacitance and the variable resistor can cooperate to form a high-pass filter that passes only high-frequency components of a drive signal—input to the drive electrode during a scan cycle—to the sense signal. In particular, when the controller 160 drives the drive electrode with a drive signal (e.g., a single rising edge of a square wave up to a reference voltage potential) during a scan cycle, the air-gap capacitor formed by the drive electrode and sense electrode pair 120 can pass higher-frequency components of this drive signal to the sense electrode, which produces an oscillating voltage component at the sense electrode. When an input is applied to the touch sensor surface 140 over the drive electrode and sense electrode pair 120, the trapped air volume is displaced laterally as the force-sensitive layer 130 moves toward the drive electrode and sense electrode pair 120, thereby: reducing the height of the air gap 150 between the drive electrode and sense electrode pair 120; increasing the characteristic capacitance of the air-gap capacitor; passing more of the high-frequency components of the drive signal to the sense electrode; and increasing the amplitude of the oscillating voltage component of the sense signal read from the sense electrode. Therefore, depression of the touch sensor surface 140 over a trapped air volume may: reduce the height of the trapped air volume; decrease the air gap 150 between this drive electrode and sense electrode pair 120; increase the capacitance of the air-gap capacitor formed by this drive electrode and sense electrode pair 120; and pass a greater amplitude of high-frequency components of the drive signal to the sense electrode, which result in a larger-amplitude AC component in the sense signal read from the sense electrode during a scan cycle.

2.3.2 DC and AC Sense Signal Components

Furthermore, because a drive electrode and sense electrode pair 120, an adjacent region of the force-sensitive layer 130, and an air volume trapped therebetween cooperate to form a variable resistor and a variable capacitor connected in parallel, the drive electrode and sense electrode pair 120 can pass both DC and AC components of the drive signal—input to the drive electrode during a scan cycle—to the sense electrode, which yields a sense signal that contains both DC and AC components, as shown in FIGS. 1A, 1B, and 3. However, the variable resistor passes DC components of the drive signal exclusively, and the variable capacitor passes AC components of the drive signal exclusively. Therefore, the controller 160 can disambiguate components of the sense electrode directly passed by the variable resistor and the variable capacitor based on the DC and AC components of the sense signal, respectively.

2.3.3 Input and Applied Force Detection

Accordingly, the controller 160 can: extract a DC component from the sense electrode (e.g., a DC voltages); calculate a magnitude of the DC sense signal component (which represents a resistance across the adjacent region of the force-sensitive layer 130); interpret a first resistance-based force value applied over the drive electrode and sense electrode pair 120 based on the magnitude of the DC sense signal component; extract the AC component from the sense electrode; calculate an amplitude (e.g., a peak-to-peak amplitude) of the AC sense signal component (which represents a capacitance across the drive electrode and sense electrode pair 120); and interpret a second capacitance-based force value applied over the drive electrode and sense electrode pair 120 based on the amplitude of the AC sense signal component, as shown in FIGS. 1A, 1B, 6A, and 6B.

For example, if the first resistance-based force value is null (e.g., if the magnitude of the DC sense signal component is approximately null), the controller 160 can estimate a total force applied to the touch sensor surface 140 over the drive electrode and sense electrode pair 120 based on (e.g., equal to) the second capacitance-based force value—that is, based on the amplitude of the AC components of the sense signal. If the second capacitance-based force value—and therefore the amplitude of the AC components of the sense signal—exceeds a threshold, the controller 160 can thus: detect presence and force magnitude of an input on the touch sensor surface 140 over the drive electrode and sense electrode pair 120 based on (e.g., equal to) the second capacitance-based force value; and output the location and force magnitude of this input accordingly.

Similarly, if the first resistance-based force value exceeds a low force threshold (e.g., 10 grams, 0.1 Newtons), the controller 160 can estimate the total force applied to the touch sensor surface 140 over the drive electrode and sense electrode pair 120 based on (e.g., equal to) the first resolution-based force value and ignore the second capacitance-based force value because the force-sensitive layer 130 is likely to be in proper contact with the drive electrode and sense electrode pairs 120 given this total applied force. If the first resistance-based force value—and therefore the magnitude of the DC component of the sense signal—exceeds a threshold, the controller 160 can thus: detect presence and force magnitude of an input on the touch sensor surface 140 over the drive electrode and sense electrode pair 120 based on (e.g., equal to) the first resistance-based force value; and output the location and force magnitude of this input accordingly.

However, if the first resistance-based force value is non-zero but less than the low force threshold (e.g., 10 grams, 0.1 Newtons), the controller 160 can estimate the total force applied to the touch sensor surface 140 over the drive electrode and sense electrode pair 120 based on a combination (e.g., an average, a sum) of the first resolution-based force value and the second capacitance-based force value (e.g., because the force-sensitive layer 130 may not yet be in proper contact with the drive electrode and sense electrode pairs 120 and inconsistent contact between the force-sensitive layer 130 and the drive electrode and sense electrode pair 120 may create induce noise in the sense signal). Accordingly, the controller 160 can: detect presence and force magnitude of an input on the touch sensor surface 140 over the drive electrode and sense electrode pair 120 based on (e.g., based on a combination of) the first resistance-based force value and the second capacitance-based force value; and output the location and force magnitude of this input accordingly.

2.3.4 Force-Sensitive Layer as Electrical Shield

Furthermore, because the force-sensitive layer 130 contains conductive material, the force-sensitive layer 130 may also electrically shield these air-gap capacitors from electrical noise over the touch sensor surface 140, thereby maintaining a high signal-to-noise ratio in the AC component of this sense signal.

2.3.5 Entire Sensor

The controller 160 can execute the foregoing process to: derive DC and AC components from sense signals read from all drive electrode and sense electrode pairs 120 during a scan cycle; interpret resistance-based and capacitance-based force magnitudes of inputs applied over these drive electrode and sense electrode pairs 120 during the scan cycle based on the DC and AC components derived from their corresponding sense signal; and assemble these data to predict locations and force magnitudes of inputs across the entire touch sensor surface 140.

For example, the controller 160 can execute Blocks of the method S100 to: read sense signals from drive electrode and sense electrode pairs 120 in the sensor array during a scan cycle; extract DC components from the sense signals; identify a first subset of DC sense signal components that fall within a range of values that indicate proper local contact between the force-sensitive layer 130 and corresponding drive electrode and sense electrode pairs 120 (e.g., voltages between 1% to 100% of the reference voltage potential of a drive signal); and identify a second subset of DC sense signal components that fall outside of this range of values and therefore indicate presence of a trapped air volume between the force-sensitive layer 130 and corresponding drive electrode and sense electrode pairs 120. Based on the first subset of DC sense signal components, the controller 160 can then: identify a first subset of drive electrode and sense electrode pairs 120 in contact with the force-sensitive layer 130 during the scan cycle; and then interpret force magnitudes applied to the touch sensor surface 140 over this first subset of drive electrode and sense electrode pairs 120 (e.g., based on resistances represented in DC components of sense signals read from these drive electrode and sense electrode pairs 120 during the scan cycle).

Conversely, the controller 160 can identify a second subset of drive electrode and sense electrode pairs 120 that are not in contact with the force-sensitive layer 130 during the scan cycle based on the second subset of AC sense signal components. Accordingly, the controller 160 can: derive AC components from this second subset of sense signals; and detect (light) forces applied to the touch sensor surface 140 over these drive electrode and sense electrode pairs 120 based on the magnitudes of AC sense signal components read from these drive electrode and sense electrode pairs 120 during the scan cycle.

Therefore, the controller 160 can execute Blocks of the method S100 to: detect presence and force magnitudes of inputs applied to the touch sensor surface 140 over a first subset of drive electrode and sense electrode pairs 120 in proper contact with the force-sensitive layer 130 based on DC components of sense signals read from these drive electrode and sense electrode pairs 120; and detect presence and force magnitudes of inputs (e.g., low-force inputs) applied to the touch sensor surface 140 over a second subset of drive electrode and sense electrode pairs 120 not in contact with the force-sensitive layer 130 (e.g., due to manufacturing defects) based on AC components of sense signals read from these drive electrode and sense electrode pairs 120.

2.3.6 Input Tracking

Furthermore, the controller 160 can execute Blocks of the method S100 to track an input moving across the touch sensor surface 140 between regions that do and do not contain defects (e.g., trapped air volumes) based on AC sense signal components and DC sense signal components, respectively, in order to: preserve detection of a continuous input; and avoid premature interpretation of removal of the input from the touch sensor surface 140, such as especially for light-force inputs on the touch sensor surface 140.

2.3.6.1 First Scan Cycle

Figure 5A:
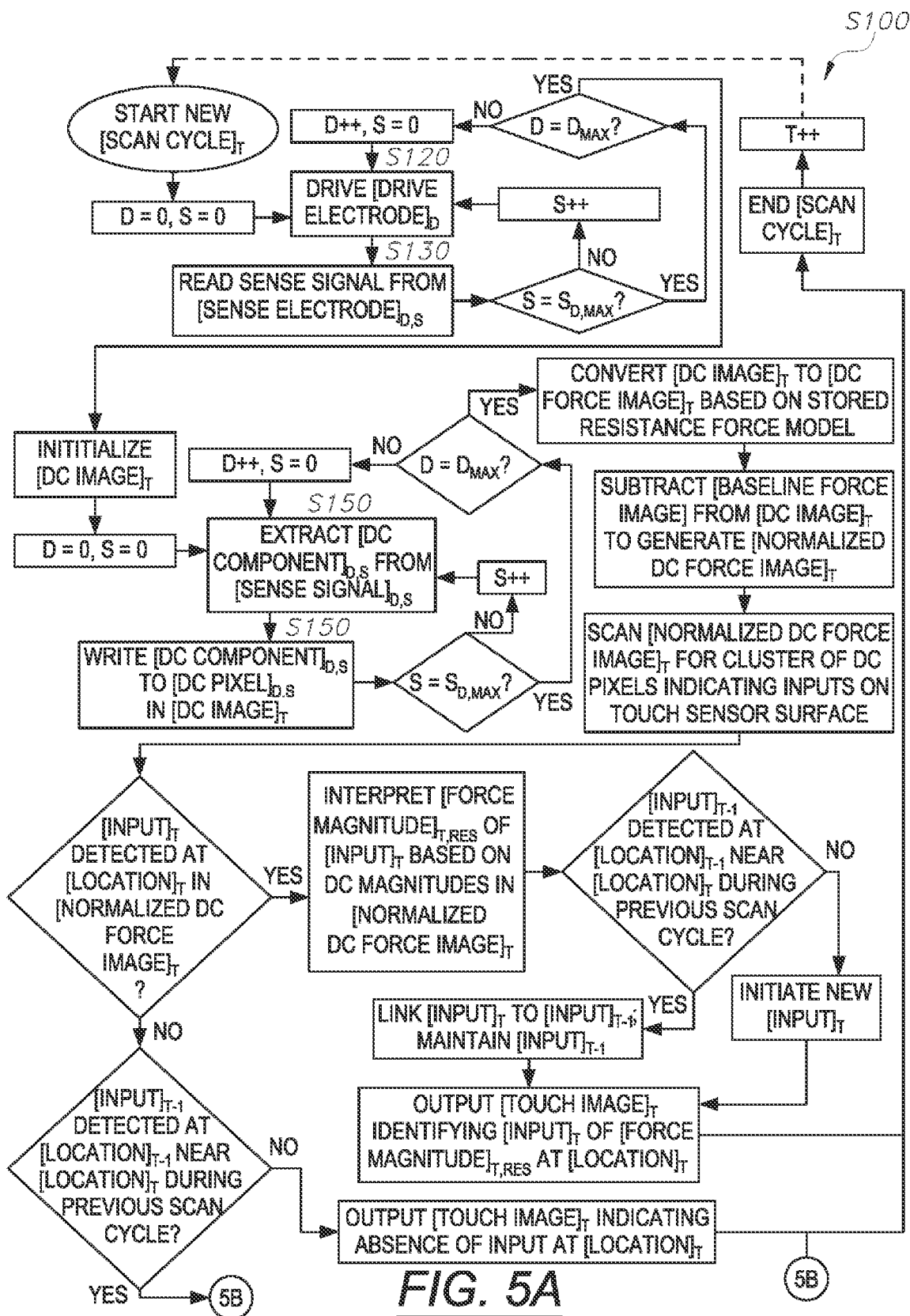
FIGS. 5A and 5B are flowchart representations of one variation of the method.
Figure 5B:
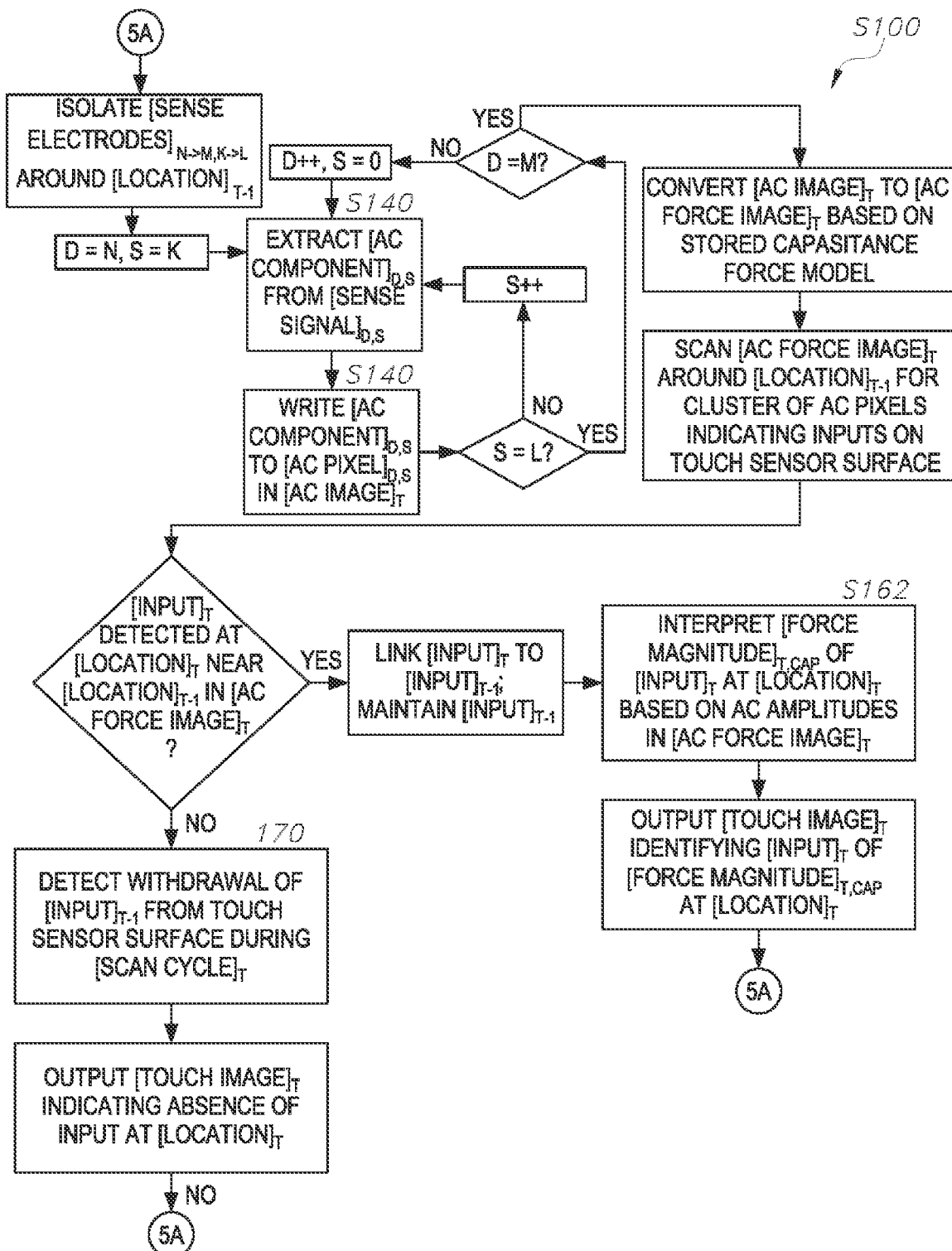

In one implementation as shown in FIGS. 5A and 5B, during a first scan cycle, the controller 160 can: serially drive the set of drive electrodes with a drive signal in Block S120; and serially read sense signals from each sense electrode in Block S130. For example, the controller 160 can: drive a drive electrode with a single rising edge of a square wave up to a reference voltage potential; concurrently read a timeseries of voltages (i.e., a sense signal) from a corresponding sense electrode over a time duration greater than multiple time constants of an air-gap capacitor formed by this drive electrode and sense electrode pair 120 (e.g., five microseconds); and repeat this process for each sense electrode in the sensor array. The controller 160 can then: derive a DC component (e.g., a steady-state voltage) from the sense signal read from each drive electrode and sense electrode pair 120 during the first scan cycle in Block S150; generate a first DC image (or a "resistance image") that contains an array of pixels representing magnitudes of DC components of sense signals read from each sense electrode during this first scan cycle in Block S150; and scan this first DC image for DC magnitudes that indicate application of non-zero forces on the touch sensor surface 140.

For example, the controller 160 can: retrieve a baseline DC image that represents baseline DC voltages of sense electrodes (or baseline resistances across drive electrode and sense electrode pairs 120) when no input is applied to the touch sensor surface 140; subtract the baseline DC image from the first DC image for the current scan cycle in order to generate a first normalized DC image; transform normalized DC component values in each pixel in the first normalized DC image into a force value based on a force function (e.g., a scalar value or a nonlinear model); generate a first DC force image that contains an array of pixels that represent forces carried by each corresponding drive electrode and sense electrode pair 120 during this first scan cycle; and implement a smoothing filter to reduce noise in the first DC force image.

The controller 160 can then: identify a first cluster of pixels indicating non-zero (i.e., elevated) forces in the first DC force image in Block S164; calculate a first location of a first input on the touch sensor surface 140 during the first scan cycle based on a centroid of this cluster of pixels; and interpret a total force magnitude of this first input during the first scan cycle based on a combination (e.g., a sum) of the individual force magnitudes represented by pixels in this cluster of pixels in the first DC force image.

2.3.6.2 Second Scan Cycle

The controller 160 can: repeat this process during a second scan cycle to generate a second DC force image in Block S150; and scan a subregion of the second DC image—encompassing a location of the first input detected during the first scan cycle—for a second cluster of DC pixels containing non-zero force values. In response to detecting this second cluster of DC pixels in the second DC force image, the controller 160 can: implement input tracking techniques to link the second cluster of DC pixels to the first input; calculate a second location of the first input on the touch sensor surface 140 during the second scan cycle based on a centroid of this second cluster of DC pixels; and interpret a total force magnitude of this first input during the second scan cycle based on a combination of the individual force magnitudes represented by pixels in this second cluster of DC pixels in the second DC force image.

2.3.6.3 Input Lost in Second DC Force Image

However, in response to absence of the second cluster of DC pixels proximal the first location of the first input in the second DC force image (or in the second normalized DC image), the controller 160 can: derive an AC component from the sense signal read from each drive electrode and sense electrode pair 120 during the second scan cycle in Block S140; and generate a second AC image (or a "capacitance image") that contains an array of pixels representing amplitudes of AC components of sense signals read from each sense electrode during this second scan cycle in Block S140. The controller 160 can then scan a subregion of the second AC image—encompassing a location of the first input detected during the first scan cycle—for a second cluster of AC pixels containing non-zero AC amplitudes.

In response to detecting this second cluster of AC pixels in the second AC image in Block S162, the controller 160 can: implement input tracking techniques to link the second cluster of AC pixels to the first input; and calculate a second location of the first input on the touch sensor surface 140 during the second scan cycle based on a centroid of this second cluster of AC pixels. The controller 160 can thus preserve detection of this first input as the first input moves: from the first location on the touch sensor surface 140 over a first cluster of drive electrode and sense electrode pairs 120 not separated from the force-sensitive layer 130 by a defect (e.g., a trapped air volume) and that present viable DC signals responsive to applied forces; to a second location on the touch sensor surface 140 over a second cluster of drive electrode and sense electrode pairs 120 that are separated from the force-sensitive layer 130 by a defect and that do not present viable DC signals responsive to applied forces (of limited force magnitude).

The controller 160 can also estimate the force magnitude of the first input over the second location based on the combined AC amplitudes represented in the second cluster of pixels in the second AC image. (The controller 160 can additionally or alternatively convert the second AC image to a second AC force image based on a capacitance-based force function, such as by multiplying the second AC image by a scalar value or passing AC magnitudes in the second AC image through a nonlinear force model. The controller 160 can then implement the foregoing process based on the second AC force image rather than the second AC image.)

2.3.6.4 Third Scan Cycle

Furthermore, the controller 160 can repeat this process during a next scan cycle to: generate a third DC force image based on DC sense signal components read from the sense electrodes in Block S150; scan a subregion of the third DC image—encompassing a location of the first input detected during the second scan cycle—for a second cluster of DC pixels containing non-zero force values; and implement input tracking techniques to link this third cluster of DC pixels to the first input in Block S164 if the third cluster of DC pixels is present in the third DC force image. Similarly, if the third cluster of DC pixels is not present in the third DC force image, the controller 160 can: generate and scan a third AC image for a third cluster of AC pixels containing non-zero AC amplitudes in Block S140; preserve detection of the first input in response to detecting this third cluster of AC pixels in the third AC image proximal the last detected location of the first input in Block S162; or end the first input in response to absence of such as cluster of AC pixels in the third AC image, as described below.

The controller 160 can therefore link the first input at the second location to a third location on the touch sensor surface 140 based on either DC or AC sense signal components captured during the third scan cycle in order to continuously track the first input moving across the touch sensor surface 140—such as approaching, moving over, and then moving past a defect (e.g., a trapped air volume) between the force-sensitive layer 130 and the substrate 110 proximal the second location.

2.3.6.5 Input Absent in Second AC Force Image

However, in response to detecting both absence of the second cluster of DC pixels in the second DC force image and absence of the second cluster of AC pixels in the second AC image that indicate present of an input on the touch sensor surface 140 proximal the last detected location of the first input, the controller 160 can: confirm that the first input was removed (or "released") from the touch sensor surface 140; and end (or "close") the first input accordingly in Block S170.

Additionally or alternatively, the controller 160 can repeat this process over multiple subsequent scan cycles to scan DC and AC images for indicators of the first input near its last detected location and only end the first input in response to absence of such indicators in both DC and AC images over multiple (e.g., two, five) consecutive scan cycles.

2.3.6.6 DC/AC Sense Signal Component Transition

Therefore, by transitioning between DC and AC sense signal components to detect and track the first input—after initially detecting the first input via DC sense signal components—the controller 160 can: prevent premature loss of an input moving across the touch sensor surface 140 (e.g., a "gesture"); track the complete path of the first input (and the force magnitude of the first input along this path); and only end (or "close") the first input when both the DC and AC sense signal components read from the sensor array both indicate absence of an applied force near the last detected location of the first input, as shown in FIGS. 5A and 5B.

In this implementation, the controller 160 can also execute this process to concurrently track multiple discrete inputs on the touch sensor surface 140 over multiple scan cycles and to 2.3.7 Defect Detection In the foregoing implementation, during operation, the controller 160 can execute the foregoing process to: detect the first input at the first location on the touch sensor surface 140 based on force values contained in a first cluster of DC pixels in a first DC force image; interpret a first force magnitude of the first input at the first location based on force magnitudes represented in the first cluster of DC pixels; detect absence of representation of the first input at and near the first location in the later, second DC force image; and then generate and scan a second AC image for AC amplitudes that indicate presence of an input near the first location responsive to absence of representation of the first input in the second DC force image.

Then, in response to detecting the first input in the second AC image at second location near the first location, the controller 160 can: preserve detection of the first input from the first location during the first scan cycle to the second location during the second scan cycle; and estimate a second force magnitude of the first input at the second location based on amplitudes of AC pixels representing the first in the second AC image, as described above. The controller 160 can also flag the second location as a location of a possible defect within the system 100, such as if the second force magnitude derived from these AC sense signal components is large or similar to the first force magnitude of the input at the first location, as shown in FIG. 5B.

2.3.7.1 Defect Map

Furthermore, the computer system 100 can then repeat the methods and techniques described above for subsequent scan cycles to detect and track the first input. If the controller 160 can then tracks the first input to a third location based on a later, third DC force image—rather than a later, third AC image—the controller 160 can predict or confirm the defect at the second location and annotate a defect map for the system 100 to indicate the defect at the second location.

Then, during future scan cycles, the controller 160 can: generate AC sub-images based on AC components of sense signals read from drive electrode and sense electrode pairs 120 at (and around) the second location indicated in the defect map; and scan these sub-images for AC amplitudes that indicate forces applied to the touch sensor surface 140 at the second location, such as rather than or in addition to scanning corresponding regions of DC force images for inputs. Therefore, because the defect at the second location may inhibit contact between the force-sensitive layer 130 and drive electrode and sense electrode pairs 120 at and near the second location, the controller 160 can detect and activate an input at the second location on the touch sensor surface 140 based on AC amplitudes contained in AC sub-images representing the region around the second location rather than based on DC sense signal components represented in DC force images.

Furthermore, the sizes, frequency, and distribution of such trapped air volumes may vary and may be unpredictable across many units of the system 100. Therefore, upon detecting an input at the second location based on AC sense signal components read from the adjacent drive electrode and sense electrode pairs 120 at a later time, the controller 160 can also scan the concurrent DC force image for DC sense signal components that also indicate this input at the second location. Then, upon detecting this input in the DC force image, the controller 160 can clear the defect at the second location from the defect map and revert to first scanning DC force images for inputs proximal the second location.

The controller 160 can therefore repeat this process over time to develop and maintain an accurate map of defects between the force-sensitive layer 130 and the substrate no and can selectively transition between detecting initial application of inputs on the touch sensor surface 140 based on DC or AC sense signal components according to defects indicated in this defect map.

2.3.8 Dynamic Range Expansion

In another example, the controller 160 can also transition from a) detecting and tracking an input on the touch sensor surface 140 over a trapped air volume in Block S162 based on an AC sense signal component read from a drive electrode and sense electrode pair 120 during a first scan cycle to b) detecting and tracking this input at the same location on the touch sensor surface 140 in Block S164 based on a DC sense signal component read from this drive electrode and sense electrode pair 120 during a later scan cycle in response to the force magnitude of this input increasing sufficiently to drive the touch sensor surface 140 into contact with the adjacent drive electrode and sense electrode pairs 120, which produces a non-zero DC sense signal component at the drive electrode and sense electrode pair 120.

In a similar example, the controller 160 can transition from a) detecting and tracking an input on the touch sensor surface 140 in Block S164 based on a DC sense signal component read from a drive electrode and sense electrode pair 120 during a first scan cycle to b) detecting and tracking this input at this same location based on an AC sense signal component read from this drive electrode and sense electrode pair 120 during a later scan cycle in Block S162 in response to the force magnitude of this input decreasing sufficiently to enable the force-sensitive layer 130 to separate from the drive electrode and sense electrode pairs 120, thereby yielding a (near-) zero DC sense signal component at the sense electrode.

Therefore, by executing Blocks of the method S100, the controller 160 can detect and track inputs over a large range of force magnitudes over the entire touch sensor surface 140, including: low-force inputs (e.g., less than 10 grams or 0.1 Newtons) over trapped air volumes based on AC sense signal components; very-low-force inputs (less than 5 grams or 0.05 Newtons) over regions of the force-sensitive layer 130 in contact with the substrate no based on combinations of DC and AC sense signal components; higher-force inputs (e.g., greater than 10 grams or 0.1 Newtons) that displace trapped air volumes to bring the force-sensitive layer 130 into contact with adjacent drive electrode and sense electrode pairs 120 based on DC sense signal components; and higher-force (e.g., greater than 5 grams or 0.05 Newtons) inputs that compress the force-sensitive layer 130 against drive electrode and sense electrode pairs 120—over regions of the substrate no excluding voids or manufacturing defects—based on DC sense signal components.

2.3.9 Sensor Scope

Furthermore, the sizes, frequency, and distribution of such trapped air volumes may vary and may be unpredictable across many units of the system 100. Application of an input on the touch sensor surface 140 and/or a gesture applied across the touch sensor surface 140 may redistribute (or "move") a trapped air volume across the substrate 110 in unpredictable ways. Therefore, the controller 160 can execute Blocks of the method S100 to automatically transition between to detecting inputs across the touch sensor surface 140 based on DC and AC sense signal components read from the sensor array in order to compensate for changes in sizes, frequency, and/or distribution of trapped air volumes between the substrate 110 and the force-sensitive layer 130 over time.

2.4 Intended Air Gap

Figure 6A:
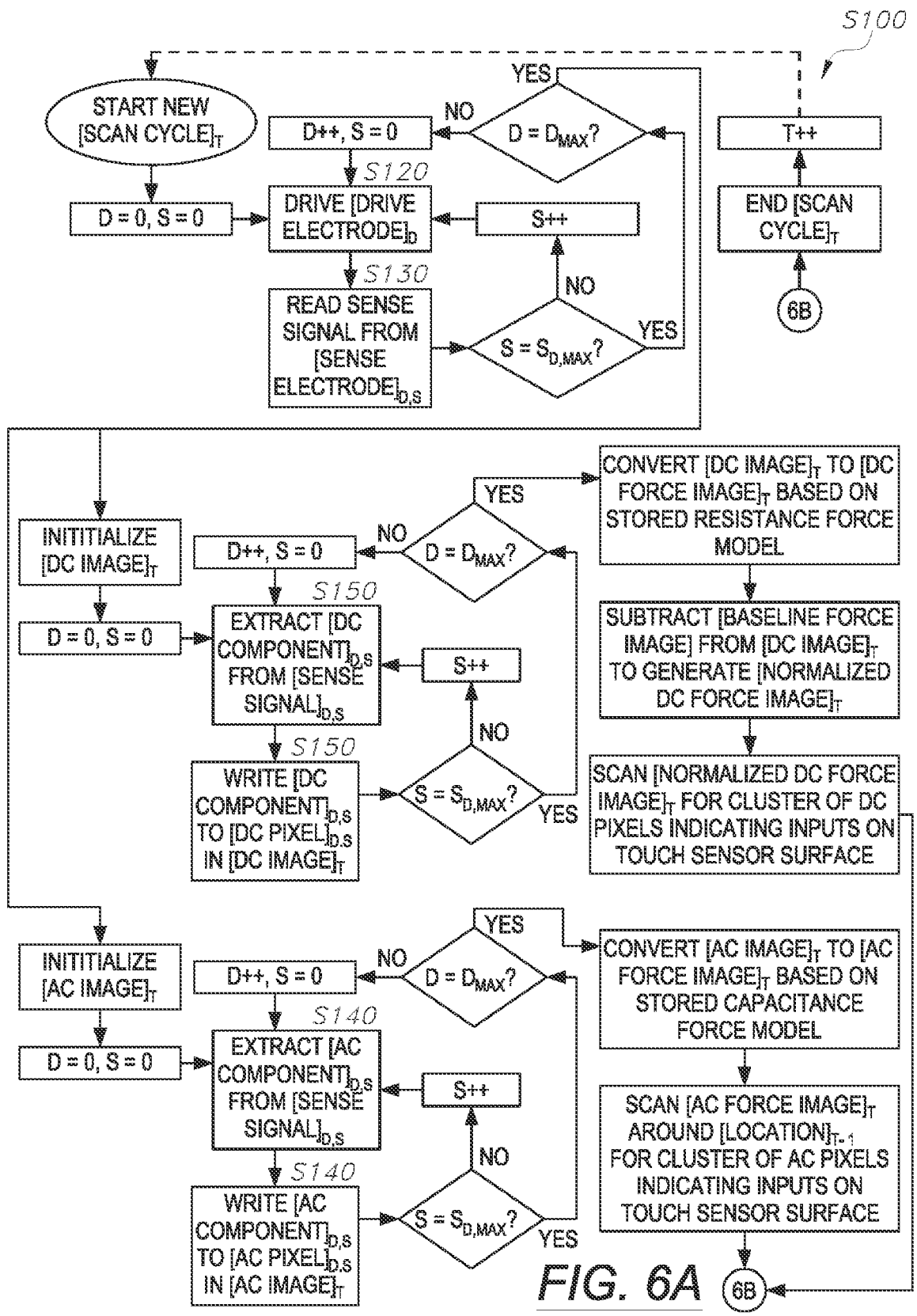
FIGS. 6A and 6B are flowchart representations of one variation of the method.
Figure 6B:
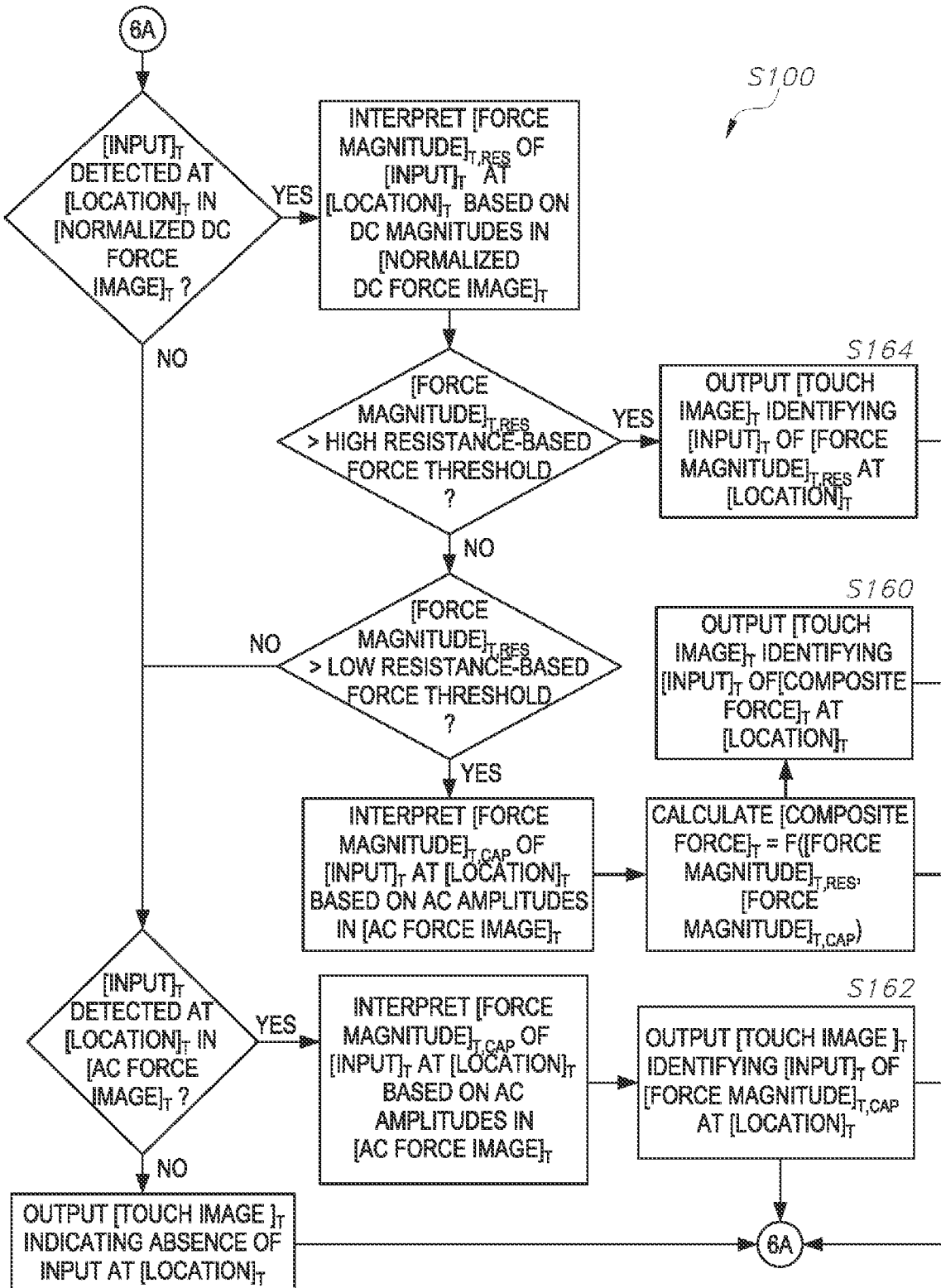

In one variation as shown in FIGS. 6A and 6B, the system 100 is assembled with an intended air gap 150 between the force-sensitive layer 130 and the substrate 110. For example, during assembly of the system 100, a volume of air (or gas, such as nitrogen argon) sufficient to form a uniform air gap 150 10 microns in height is injected between the force-sensitive layer 130 and the substrate 110. In another example, the force-sensitive layer 130 is selectively adhered or bonded to the substrate 110 around drive electrode and sense electrode pairs 120 to form an open-cell or closed-cell network of air gaps 150 around individual drive electrode and sense electrode pairs 120 or clusters of drive electrode and sense electrode pairs 120.

Thus, in this variation, the controller 160 can execute Blocks of the method S100: to detect very-light inputs (e.g., inputs of force magnitude less than 5 grams or 0.05 Newtons) on the touch sensor surface 140 based on AC sense signal components that represent changes in capacitance between drive electrode and sense electrode pairs 120 resulting from changes in height of the adjacent air gap 150 (e.g., from 10 microns to 1 micron); and to detect heavier inputs (e.g., inputs of force magnitude greater than 10 grams or 0.1 Newtons) on the touch sensor surface 140 based on DC sense signals that represent changes in resistance between drive electrode and sense electrode pairs 120 resulting from compression of the adjacent region of the force-sensitive layer 130, as shown in FIG. 6B. In this variation, the controller 160 can also execute Blocks of the method S100 to detect light inputs (e.g., inputs of force magnitude between 5 and 10 grams or between 0.05 and 0.1 Newtons) based on a combination (e.g., a sum, an average) of both AC and DC sense signal components read from sense electrode, as shown in FIG. 6B.

For example, the controller 160 can implement methods and techniques described above to: drive the array of drive electrodes with the drive signal during a scan cycle in Block S120; and read timeseries sense signals from the array of sense electrodes during this scan cycle in Block S130.

The controller 160 can then: extract DC signal components from each sense signal; calculate a magnitude of each DC component (e.g., a magnitude from 0 Volts to a peak voltage); and represent each DC magnitude in a corresponding pixel in a DC image for this scan cycle in Block S150. The controller 160 can also: subtract a stored baseline DC image from this DC image to generate a normalized DC image; or convert the DC image into a DC force image by applying a resistance force model (e.g., a scalar value) to the DC image and then substrate a baseline DC force image from this DC force image to generate a normalized DC force image.

Concurrently, the controller 160 can: extract AC signal components from each sense signal; calculate an amplitude (e.g., a peak-to-peak voltage) of each AC component; and represent each AC amplitude in a corresponding pixel in an AC image for this scan cycle in Block S140. The controller 160 can also: subtract a baseline AC image from this AC image to generate a normalized AC image; or convert the AC image into an AC force image by applying a capacitance force model (e.g., a scalar value) to the AC image and then subtract a baseline AC force image to generate a normalized AC force image.

The controller 160 can then scan the DC image (or the normalized DC image, the DC force image) for clusters of DC magnitudes that indicate inputs on the touch sensor surface 140. For each input thus detected in the DC image, the controller 160 can derive a first total resistance-based force of the input based on individual force magnitudes represented in the corresponding cluster of pixels in the DC image.

Similarly, the controller 160 can scan the AC image (or the normalized AC image, the AC force image) for clusters of AC amplitudes that indicate inputs on the touch sensor surface 140. For each input thus detected in the AC image, the controller 160 can derive a second total capacitance-based force of the input based on individual force magnitudes represented in the corresponding cluster of pixels in the AC image.

The controller 160 can then link cospatial DC- and AC-based inputs detected from these DC and AC sense signal components during this scan cycle.

Then, for each detected input associated with a first total resistance-based force exceeding a high resistance-based force threshold (e.g., 10 grams, 0.1 Newtons), the controller 160 can label the input with its corresponding first total resistance-based force in Block S164.

Similarly, for each detected input associated with a first total resistance-based force between the high resistance-based force threshold and a low resistance-based force threshold (e.g., 5 grams, 0.05 Newtons), the controller 160 can: calculate a combination (e.g., a sum, an average, a weighted average) of its corresponding first total resistance-based force and second total capacitance-based force; and label the input with this force combination in Block S160.

Furthermore, for each input associated with a non-zero second total capacitance-based force and a first total resistance-based force less than the low resistance-based force threshold (e.g., between 0 and 5 grams, between 0 and 0.05 Newtons), the controller 160 can label the input with its corresponding second total capacitance-based force in Block S1562.

The controller 160 can then compile the locations and force magnitudes of these inputs into a force image for the current scan cycle and output this force image to a connected or integrated computing device (e.g., a laptop computer, a desktop computer), which may then manipulate a graphical user interface with gestures, cursor movements, and/or clicks represented in this force image. The controller 160 can then repeat these processes for each subsequent scan cycle.

Therefore, the controller 160 can execute Blocks of the method S100 to fuse DC and AC sense signal components—representing resistance and capacitance characteristics of the drive electrode and sense electrode pairs 120 in the sensor array—to detect both a) low- to high-force-magnitude inputs on the touch sensor surface 140 b) and low- to very-low-force-magnitude inputs on the touch sensor surface 140, respectively. Accordingly, the controller 160 can achieve a wide dynamic range for detection of both presence and force magnitude of inputs on the touch sensor surface 140 during operation.

Furthermore, in the foregoing implementation, the controller 160 can implement similar methods and techniques to detect presence and force magnitudes of inputs over individual drive electrode and sense electrode pairs 120 in the sensor array based on values contained in individual DC and AC pixels in the DC and AC images, respectively, rather than detect presence and force magnitudes indicate greater areas of inputs applied to the touch sensor surface 140 based on clusters of DC and AC pixels in the DC and AC images.

2.5 Sensor Array System

Therefore, as described above and shown in FIGS. 1A and 1B, the system 100 can include: a substrate 110; an array of drive electrode and sense electrode pairs 120 arranged on the substrate 110; a force-sensitive layer 130 coupled to the substrate 110, abutting the array of drive electrode and sense electrode pairs 120, and exhibiting variations in local contact (or bulk resistance) responsive to variations in applied force; and a touch sensor surface 140 arranged over the substrate 110. The system 100 can further include a controller 160 configured to, during a first scan cycle: read a first sense signal from a first drive electrode and sense electrode pair 120, in the array of drive electrode and sense electrode pairs 120; detect a first alternating-current component of the first sense signal; detect a first direct-current component of the first sense signal; and, in response to a first magnitude of the first direct-current component of the first sense signal falling below a threshold magnitude, detect a first input on the touch sensor surface 140 at a first location proximal the first drive electrode and sense electrode pair 120 based on the first alternating-current component of the first sense signal. The controller 160 can be further configured to, during a second scan cycle: read a second sense signal from a second drive electrode and sense electrode pair 120, in the array of drive electrode and sense electrode pairs 120; detect a second direct-current component of the second sense signal; and, in response to the second magnitude of the second direct-current component of the second sense signal exceeding the threshold magnitude, detect a second input on the touch sensor surface 140 at a second location proximal the second drive electrode and sense electrode pair 120 based on the second direct-current component of the second sense signal.

In this implementation: the array of drive electrode and sense electrode pairs 120 can be arranged over a top layer of the substrate 110; the force-sensitive layer 130 can be arranged over the substrate no and include a first region that entraps a volume of air over the first drive electrode and sense electrode pair 120; the first drive electrode and sense electrode pair 120 and a first region of the force-sensitive layer 130 adjacent the first drive electrode and sense electrode pair 120 can cooperate to form a first variable resistor that passes direct-current components of a drive signal, input to a first drive electrode, to a first sense electrode in the first drive electrode and sense electrode pair 120; and the first drive electrode and sense electrode pair 120 and the volume of air can cooperate to form a first variable air-gap capacitor connected in parallel to the first variable resistor and that passes high-frequency components of the drive signal to the first sense electrode.

Furthermore, in this implementation, a first region of the force-sensitive layer 130 can: entrap the volume of air of a nominal height over the first drive electrode and sense electrode pair 120 in a nominal state during absence of inputs on the touch sensor surface 140; and displace the volume of air laterally across the substrate 110 and moves toward the first drive electrode and sense electrode pair 120 to increase characteristic capacitance of the variable air-gap capacitor responsive to application of the first input on the touch sensor surface 140 at the first location proximal the first drive electrode and sense electrode pair 120. Accordingly, the controller 160 can interpret a first force magnitude of the first input on the touch sensor surface 140 during the first scan cycle proportional to a first amplitude of the first alternating-current component of the first sense signal.

(The controller 160 can also read a third sense signal from the first drive electrode and sense electrode pair 120 and detect a third direct-current component of the third sense signal. Then, in response to a third magnitude of the third direct-current component of the third sense signal exceeding the threshold magnitude, the controller 160 can: detect a third input on the touch sensor surface 140 at the first location proximal the first drive electrode and sense electrode pair 120; calculate a third change in resistance across the first drive electrode and sense electrode pair 120 during the third scan cycle based on the third magnitude of the third direct-current component of the second sense signal; and interpret a third force magnitude of the third input on the touch sensor surface 140 during the third scan cycle proportional to the third change in resistance across the first drive electrode and sense electrode pair 120.)

Additionally or alternatively, the first region of the force-sensitive layer 130 can: entrap the volume of air of a nominal height of approximately 10 microns over the first drive electrode and sense electrode pair 120 in a nominal state during absence of inputs on the touch sensor surface 140; include a conductive material that electrically shields the first drive electrode and sense electrode pair 120 from electrical noise above the touch sensor surface 140; and displace air laterally across the substrate 110 and moves toward the first drive electrode and sense electrode pair 120 to increase capacitance of the first drive electrode and sense electrode pair 120 responsive to application of the first input on the touch sensor surface 140 at the first location proximal the first drive electrode and sense electrode pair 120. Accordingly, the controller 160 can: interpret a reduction in height of the volume of air, from the nominal height, during the first scan cycle proportional to the amplitude of the first alternating-current component of the first sense signal; retrieve a spring model representing combined spring constants of the force-sensitive layer 130 and the volume of air moving laterally between the force-sensitive layer 130 and the substrate no; and interpret a first force magnitude of the first input on the touch sensor based on the reduction in height of the volume of air and the spring constant.

2.6 Discrete Array of Drive Electrode and Sense Electrodes

Figure 7:
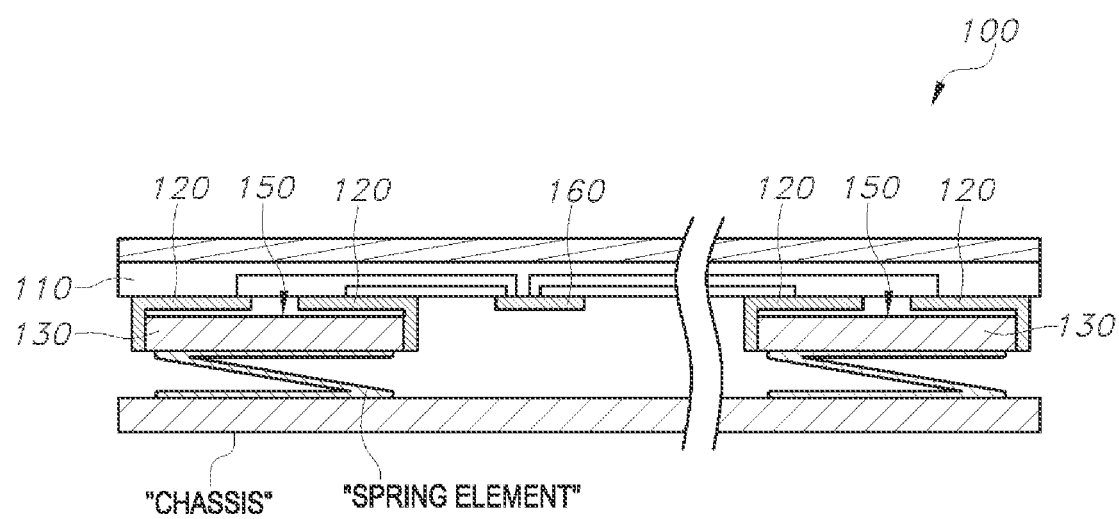
FIG. 7 is a schematic representation of one variation of the system.

In one variation as shown in FIG. 7, the system 100 includes a controller 160 and an array of discrete (e.g., discontinuous) pressure sensor elements arranged beneath the touch sensor surface 140, each including: a drive electrode and sense electrode pair 120 (e.g., a pair of interdigitated electrodes) formed on a substrate no (e.g., a common PCB that spans the array of discrete pressure sensors); a force-sensitive layer 130 arranged over the drive electrode and sense electrode pair 120; a deflection spacer (e.g., a silicone pad) or a spring that couples the discrete pressure sensor and the substrate no to a chassis of an electronic device.

In one implementation, in this variation: the substrate no can define a 3.5-inch by 4.5-inch area; the touch sensor surface 140 can be arranged over a top layer of the substrate 110 to form 3.5-inch by 4.5-inch active input area; each pressure sensor can include a 0.25-inch-diameter force-sensitive layer 130 coupled to a drive electrode and sense electrode pair 120 spanning 0.25-inch-diameter region on a bottom layer of the substrate 110; and the system 100 can include ten pressure sensors supporting the perimeter of the substrate 110 on the chassis of the computing device.

In one example of this implementation, the force-sensitive layer 130 can be bonded to the substrate 110 at each pressure sensor location with intended contact between the force-sensitive layer 130 and the drive electrode and sense electrode pair 120 under a no-load condition on the touch sensor surface 140. However, in this example, a defect in the force-sensitive layer 130, a defect in the substrate 110, or depression of the touch sensor surface 140 remotely from this pressure sensor may create an air gap 150 between or otherwise separate from the drive electrode and sense electrode pair 120 from the force-sensitive layer 130 in this pressure sensor. Therefore, in this example, the controller 160 can implement methods and techniques described above to detect and characterize a force carried by the pressure sensor based on AC components of a sense signal read from the pressure sensor given absence of a DC sense signal component in this sense signal.

In another example of this implementation, the force-sensitive layer 130 in a pressure sensor is bonded (e.g., affixed) to the substrate 110 about its perimeter and around the adjacent drive electrode and sense electrode pair 120 to seal a volume of air—inside the pressure sensor—that forms an air gap 150 of a target height (e.g., 10 microns) between the force-sensitive layer 130 and the drive electrode and sense electrode pair 120 under a no-load condition on the touch sensor surface 140. In this example, the controller 160 can implement methods and techniques described above to detect and characterize: a) low to high force magnitudes (e.g., 10-250 grams, 0.1 to 2.5 Newtons) carried by the pressure sensor based on DC sense signal components read from the drive electrode and sense electrode pair 120; very-low force magnitudes (e.g., less than 5 grams, less than 0.05 Newtons) carried by the pressure sensor based on AC sense signal components read from the drive electrode and sense electrode pair 120; and very-low to low force magnitudes (e.g., between 5 and 10 grams, between 0.05 and 0.1 Newtons) carried by the pressure sensor based on combinations of DC and AC sense signal components read from the drive electrode and sense electrode pair 120.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting an input at a touch sensor comprising:
   during a first scan cycle:
   driving a first drive electrode with a drive signal;
   reading a first sense signal from a first sense electrode paired with the first drive electrode;
   detecting a first alternating component of the first sense signal;
   detecting a first direct component of the first sense signal; and
   in response to a first magnitude of the first direct component of the first sense signal falling below a threshold magnitude, detecting a first input on a touch sensor surface based on the first alternating component of the first sense signal; and
   during a second scan cycle:
   driving the first drive electrode with the drive signal;
   reading a second sense signal from the first sense electrode;
   detecting a second alternating component of the second sense signal;
   detecting a second direct component of the second sense signal; and
   in response to a second magnitude of the second direct component of the second sense signal exceeding the threshold magnitude, detecting a second input on the touch sensor surface based on the second direct component of the second sense signal.

2. The method of claim 1:
   wherein detecting the first direct component of the first sense signal comprises detecting the first direct component of the first sense signal representing a direct-current component of the drive signal passed by a variable resistor formed by the first drive electrode, the first sense electrode, and a force-sensitive layer; and
   wherein detecting the first alternating component of the first sense signal comprises detecting the first alternating component of the first sense signal representing high-frequency components of the drive signal passed by a variable air-gap capacitor:
   formed by the first drive electrode, the first sense electrode, and a volume of air trapped between the force-sensitive layer and a substrate supporting the first drive electrode and the first sense electrode;
   connected in parallel to the variable resistor; and
   electrically shielded from the first input on the touch sensor surface by the force-sensitive layer.

3. The method of claim 1, wherein detecting the first input on the touch sensor surface based on the first alternating component of the first sense signal comprises:
   interpreting a force magnitude of the first input on the touch sensor surface proportional to a first amplitude of the first alternating component; and
   detecting the first input on the touch sensor surface in response to the force magnitude exceeding a threshold force magnitude.

4. The method of claim 3, wherein interpreting the force magnitude of the first input on the touch sensor comprises:
   interpreting a reduction in height of an air gap, between a force-sensitive layer and a substrate supporting the first drive electrode and the first sense electrode, proportional to the first amplitude of the first alternating component;
   retrieving a spring constant of the force-sensitive layer and the air gap; and
   interpreting the force magnitude of the first input on the touch sensor based on the reduction in height of the air gap and the spring constant.

5. The method of claim 1, wherein detecting the second input on the touch sensor surface based on the second direct component of the second sense signal comprises:
   calculating a resistance across the first drive electrode and the first sense electrode based on the second magnitude of the second direct component of the second sense signal; and
   interpreting a force magnitude of the second input on the touch sensor surface proportional to a difference between the resistance and a baseline resistance between the first drive electrode and the first sense electrode.

6. The method of claim 1:
   further comprising, during the first scan cycle, calculating a resistance across the first drive electrode and the first sense electrode based on the first magnitude of the first direct component of the first sense signal;
   wherein detecting the first input on the touch sensor surface based on the first direct component of the first sense signal comprises, in response to the resistance exceeding a high threshold resistance:
   interpreting a first force magnitude of the first input on the touch sensor surface proportional to a first amplitude of the first alternating component of the first sense signal; and
   detecting the first input, of the first force magnitude, on the touch sensor surface;
   wherein detecting the first input on the touch sensor surface based on the first alternating component of the first sense signal comprises, in response to the resistance falling below a low threshold resistance:
   interpreting a second force magnitude of the first input on the touch sensor surface proportional to a difference between the resistance and a baseline resistance between the first drive electrode and the first sense electrode; and
   detecting the first input, of the second force magnitude, on the touch sensor surface; and
   further comprising, during the first scan cycle, in response to the resistance falling below the high threshold resistance and exceeding the low threshold resistance:
   calculating a composite force magnitude based on a combination of the first force magnitude and the second force magnitude; and
   detecting the first input, of the composite force magnitude, on the touch sensor.

7. The method of claim 1:
   wherein driving the first drive electrode with the drive signal during the first scan cycle comprises sequentially driving a set of drive channels, defining a set of drive electrodes within a sensor array, with the drive signal during the first scan cycle;
   wherein reading the first sense signal from the first sense electrode comprises sequentially reading a set of sense signals from a set of sense channels, defining a set of sense electrodes within the sensor array, during the first scan cycle;
   wherein detecting the first input on the touch sensor surface comprises detecting the first input at a first location on the touch sensor surface during the first scan cycle based on the first sense signal, the first location proximal the first drive electrode and the first sense electrode; and further comprising, during the first scan cycle:
- detecting a third alternating component of a third sense signal, in the set of sense signals, read from a third sense electrode in the set of sense electrodes;
- detecting a third direct component of the third sense signal;
- detecting absence of a third input at a third location on the touch sensor surface in response to a third amplitude of the third alternating component falling below a threshold amplitude and in response to a third magnitude of the third direct component falling below the threshold magnitude, the third location proximal the third drive electrode and the third sense electrode; and
- compiling the first location of the first input and absence of the third input at the third location into a first touch image representing inputs on the touch sensor surface.

8. The method of claim 1:
wherein detecting the first input on the touch sensor surface comprises detecting the first input at a first location on the touch sensor surface during the first scan cycle based on the first sense signal, the first location proximal the first drive electrode and the first sense electrode; and further comprising, during a third scan cycle:
- driving the first drive electrode with the drive signal;
- reading a third sense signal from the first sense electrode;
- detecting a third alternating component of the third sense signal;
- detecting a third direct component of the third sense signal; and
- detecting absence of the first input at the first location on the touch sensor surface during the third scan cycle in response to a third amplitude of the third alternating component falling below a threshold amplitude and in response to a third magnitude of the third direct component falling below the threshold magnitude.

9. A system comprising:
a substrate:
an array of drive electrode and sense electrode pairs arranged on the substrate;
a touch sensor surface arranged over the substrate; and
a controller configured to:
during a first scan cycle:
- read a first sense signal from a first drive electrode and sense electrode pair, in the array of drive electrode and sense electrode pairs;
- detect a first alternating component of the first sense signal;
- detect a first direct component of the first sense signal; and
- in response to a first magnitude of the first direct component of the first sense signal falling below a threshold magnitude, detect a first input on the touch sensor surface at a first location proximal the first drive electrode and sense electrode pair based on the first alternating-current component of the first sense signal; and during a second scan cycle:
- read a second sense signal from a second drive electrode and sense electrode pair, in the array of drive electrode and sense electrode pairs;
- detect a second direct component of the second sense signal; and
- in response to the second magnitude of the second direct component of the second sense signal exceeding the threshold magnitude, detect a second input on the touch sensor surface at a second location proximal the second drive electrode and sense electrode pair based on the second direct-current component of the second sense signal.

10. The system of claim 9, further comprising, a force-sensitive layer coupled to the substrate, abutting the array of drive electrode and sense electrode pairs, and exhibiting variations in local resistance responsive to variations in applied force.

11. The system of claim 9:
further comprising a force-sensitive layer arranged over the substrate and comprising a first region that entraps a volume of air over the first drive electrode and sense electrode pair;
wherein the array of drive electrode and sense electrode pairs is arranged over a top layer of the substrate;
wherein the first drive electrode and sense electrode pair and a first region of the force-sensitive layer adjacent the first drive electrode and sense electrode pair cooperate to form a first variable resistor that passes direct-current components of a drive signal, input to a first drive electrode, to a first sense electrode in the first drive electrode and sense electrode pair; and
wherein the first drive electrode and sense electrode pair and the volume of air cooperate to form a first variable air-gap capacitor connected in parallel to the first variable resistor and that passes high-frequency components of the drive signal to the first sense electrode.

12. The system of claim 11:
wherein the first region of the force-sensitive layer:
- entraps the volume of air of a nominal height of approximately 10 microns over the first drive electrode and sense electrode pair in a nominal state during absence of inputs on the touch sensor surface;
- comprises a conductive material that electrically shields the first drive electrode and sense electrode pair from electrical noise above the touch sensor surface; and
- displaces air laterally across the substrate and moves toward the first drive electrode and sense electrode pair to increase capacitance of the first drive electrode and sense electrode pair responsive to application of the first input on the touch sensor surface at the first location proximal the first drive electrode and sense electrode pair; and wherein the controller is configured to:
- interpret a reduction in height of the volume of air, from the nominal height, during the first scan cycle proportional to the amplitude of the first alternating component of the first sense signal;
- retrieve a spring model representing combined spring constants of the force-sensitive layer and the volume of air moving laterally between the force-sensitive layer and the substrate; and
- interpret a first force magnitude of the first input on the touch sensor based on the reduction in height of the volume of air and the spring constant.

13. The system of claim 11:
wherein the first region of the force-sensitive layer:
    entraps the volume of air of a nominal height over the first drive electrode and sense electrode pair in a nominal state during absence of inputs on the touch sensor surface; and
    displaces the volume of air laterally across the substrate and moves toward the first drive electrode and sense electrode pair to increase characteristic capacitance of the variable air-gap capacitor responsive to application of the first input on the touch sensor surface at the first location proximal the first drive electrode and sense electrode pair; and
wherein the controller is configured to interpret a first force magnitude of the first input on the touch sensor surface during the first scan cycle proportional to a first amplitude of the first alternating-current component of the first sense signal.

14. The system of claim 13, wherein the controller is further configured to, during a third scan cycle:
    read a third sense signal from the first drive electrode and sense electrode pair;
    detect a third direct component of the third sense signal; and
    in response to a third magnitude of the third direct component of the third sense signal exceeding the threshold magnitude:
        detect a third input on the touch sensor surface at the first location proximal the first drive electrode and sense electrode pair;
        calculate a third change in resistance across the first drive electrode and sense electrode pair during the third scan cycle based on the third magnitude of the third direct component of the second sense signal; and
        interpret a third force magnitude of the third input on the touch sensor surface during the third scan cycle proportional to the third change in resistance across the first drive electrode and sense electrode pair.

15. A method comprising:
during a first scan cycle:
    reading a first set of sense signals from a set of drive electrode and sense electrode pairs; and
    detecting a first input at a first location on a touch sensor surface during the first scan cycle based on a first direct component of a first sense signal, in the first set of sense signals, indicating a first change in electrical values between a first drive electrode and sense electrode pair, in the set of drive electrode and sense electrode pairs, located proximal the first location;
during a second scan cycle succeeding the first scan cycle:
    reading a second set of sense signals from the set of drive electrode and sense electrode pairs; and
    tracking the first input from the first location to a second location on the touch sensor surface during the second scan cycle based on a second direct component of a second sense signal, in the second set of sense signals, indicating a second change in electrical values between a second drive electrode and sense electrode pair, in the set of drive electrode and sense electrode pairs, located proximal the second location; and
during a third scan cycle succeeding the second scan cycle:
    reading a third set of sense signals from the set of drive electrode and sense electrode pairs;
    detecting a third direct component of a third sense signal read from a third drive electrode and sense electrode pair, in the set of drive electrode and sense electrode pairs, located proximal a third location on the touch sensor surface;
    detecting a third alternating component of the third sense signal; and
    in response to a third magnitude of the third direct component falling below a threshold magnitude, tracking the first input from the second location to the third location on the touch sensor surface during the third scan cycle based on the third alternating component of the third sense signal.

16. The method of claim 15, further comprising, during the third scan cycle, detecting release of the first input from the touch sensor surface in response to a third amplitude of the third alternating component of the third sense signal falling below a threshold amplitude.

17. The method of claim 15, further comprising, during a fourth scan cycle succeeding the third scan cycle:
    reading a fourth set of sense signals from the set of drive electrode and sense electrode pairs; and
    tracking the first input from the third location to a fourth location on the touch sensor surface during the fourth scan cycle based on a fourth direct component of a fourth sense signal, in the fourth set of sense signals, indicating a fourth change in electrical values between a fourth drive electrode and sense electrode pair, in the set of drive electrode and sense electrode pairs, located proximal the fourth location.

18. The method of claim 15, further comprising:
during the third scan cycle, driving drive electrodes, in the set of drive electrode and sense electrode pairs, with a drive signal;
extracting, from the third sense signal, the third direct component of the third sense signal that represents a direct-current component of the drive signal passed by a variable resistor during the third scan cycle, the variable resistor formed by the third drive electrode and sense electrode pair and an adjacent region of a force-sensitive layer; and
extracting, from the third sense signal, the third alternating component of the third sense signal representing high-frequency components of the drive signal passed by a variable air-gap capacitor during the third scan cycle, the variable air-gap capacitor:
    formed by the third drive electrode and sense electrode pair and a volume of air trapped between the force-sensitive layer and a substrate supporting the set of drive electrode and sense electrode pairs;
    connected in parallel to the third variable resistor; and
    electrically shielded from the first input on the touch sensor surface by the force-sensitive layer.

19. The method of claim 15, further comprising:
during the first scan cycle:
    calculating a first resistance across the first drive electrode and sense electrode pair based on a magnitude of the first direct component of the first sense signal;
    interpreting a first force magnitude of the first input on the touch sensor surface proportional to a difference between the first resistance and a baseline resistance between the first drive electrode and sense electrode pair; and
    outputting the first location and the first force magnitude of the first input; and during the third scan cycle:
- interpreting a third force magnitude of the first input on the touch sensor surface proportional to a third amplitude of the third alternating component of the third sense signal; and
- outputting the third location and the third force magnitude of the first input.

20. The method of claim 19:
- wherein calculating the first resistance across the first drive electrode and sense electrode pair comprises calculating a local contact resistance of a first region of a force-sensitive layer, arranged over the first drive electrode and sense electrode pair, based on the magnitude of the first direct component of the first sense signal, the force-sensitive layer exhibiting variations in local contact resistance responsive to local variations in applied force on the touch sensor surface; and
- wherein interpreting the third force magnitude of the first input comprises:
  - interpreting a third reduction in height of an air gap, between the force-sensitive layer and a substrate supporting the third drive electrode and sense electrode pair, proportional to the third amplitude of the third alternating-current component of the third sense signal;
  - retrieving a spring constant of the force-sensitive layer and the air gap; and
  - interpreting the third force magnitude of the first input on the touch sensor during the third scan cycle based on the third reduction in height of the air gap and the spring constant.

* * * * *